United States Patent
Tsuji et al.

(10) Patent No.: US 10,493,657 B2
(45) Date of Patent: Dec. 3, 2019

(54) SHEET-LIKE REINFORCING FIBER BASE MATERIAL, PREFORM AND FIBER-REINFORCED RESIN MOLDED PRODUCT

(71) Applicant: Toray Industries, Inc., Tokyo (JP)

(72) Inventors: Seiji Tsuji, Nagoya (JP); Masayuki Sato, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/557,667

(22) PCT Filed: Mar. 14, 2016

(86) PCT No.: PCT/JP2016/001436
§ 371 (c)(1),
(2) Date: Sep. 12, 2017

(87) PCT Pub. No.: WO2016/147646
PCT Pub. Date: Sep. 22, 2016

(65) Prior Publication Data
US 2018/0093397 A1 Apr. 5, 2018

(30) Foreign Application Priority Data
Mar. 19, 2015 (JP) .................. 2015-056292

(51) Int. Cl.
*B29B 15/10* (2006.01)
*B32B 5/12* (2006.01)
(Continued)

(52) U.S. Cl.
CPC ............ *B29B 15/105* (2013.01); *B29B 11/16* (2013.01); *B29C 70/10* (2013.01); *B29C 70/38* (2013.01);
(Continued)

(58) Field of Classification Search
CPC ....... B29B 11/16; B29B 15/105; B29C 70/10; B29C 70/38; B29C 70/382;
(Continued)

(56) References Cited

U.S. PATENT DOCUMENTS 5,552,214 A 9/1996 Kobomura et al.
2014/0205793 A1 7/2014 Henry

FOREIGN PATENT DOCUMENTS

CN 103507303 A 1/2014
EP 1 125 728 A1 8/2001
(Continued)

OTHER PUBLICATIONS

Extended European Search Report dated Oct. 8, 2018, of counterpart European Application No. 16764477.2.

*Primary Examiner* — Camie S Thompson
(74) *Attorney, Agent, or Firm* — DLA Piper LLP (US)

(57) ABSTRACT

A sheet-like reinforcing fiber base material reduces waste in production of a fiber-reinforced resin molded product and has a small position shift of a reinforcing fiber base material for reinforcement, as well as a preform and a fiber-reinforced resin molded product. The sheet-like reinforcing fiber base material is configured to maintain a sheet-like form by arraying and arranging reinforcing fiber bundles such that longitudinal directions thereof are one identical direction and restraining positions of adjacent reinforcing fiber bundles with respect to each other. In the sheet-like reinforcing fiber base material, the placement amount of reinforcing fibers is partly increased, such that the placement weight of reinforcing fibers per unit area is non-uniform.

24 Claims, 19 Drawing Sheets

(51) Int. Cl.

| | | |
|---|---|---|
| *B29C 70/10* | (2006.01) | |
| *B32B 5/24* | (2006.01) | |
| *B32B 27/08* | (2006.01) | |
| *B32B 27/16* | (2006.01) | |
| *B32B 5/00* | (2006.01) | |
| *B32B 5/28* | (2006.01) | |
| *B29C 70/38* | (2006.01) | |
| *B32B 7/08* | (2019.01) | |
| *B29B 11/16* | (2006.01) | |
| *D04H 3/04* | (2012.01) | |
| *D04H 3/115* | (2012.01) | |

(52) U.S. Cl.
CPC .............. *B29C 70/382* (2013.01); *B32B 5/00* (2013.01); *B32B 5/12* (2013.01); *B32B 5/24* (2013.01); *B32B 5/28* (2013.01); *B32B 7/08* (2013.01); *B32B 27/08* (2013.01); *B32B 27/16* (2013.01); *D04H 3/04* (2013.01); *D04H 3/115* (2013.01); *B32B 2260/021* (2013.01); *B32B 2260/046* (2013.01); *B32B 2262/106* (2013.01)

(58) Field of Classification Search
CPC ........ B32B 2260/021; B32B 2260/046; B32B 2262/106; B32B 27/08; B32B 27/16; B32B 5/00; B32B 5/12; B32B 5/28; B32B 7/08; D04H 3/08; D04H 3/04; D04H 3/115; Y10T 428/24479; Y10T 428/24603
USPC ...................................... 428/292.1, 156, 171
See application file for complete search history.

(56) References Cited

FOREIGN PATENT DOCUMENTS

| | | |
|---|---|---|
| EP | 1 408 152 A1 | 4/2004 |
| EP | 1 990 169 A1 | 11/2008 |
| JP | 56-159156 A | 12/1981 |
| JP | 5-278032 A | 10/1993 |
| JP | 8-337666 A | 12/1996 |
| JP | 2002-128921 A | 5/2002 |
| JP | 2014-159099 A | 9/2014 |

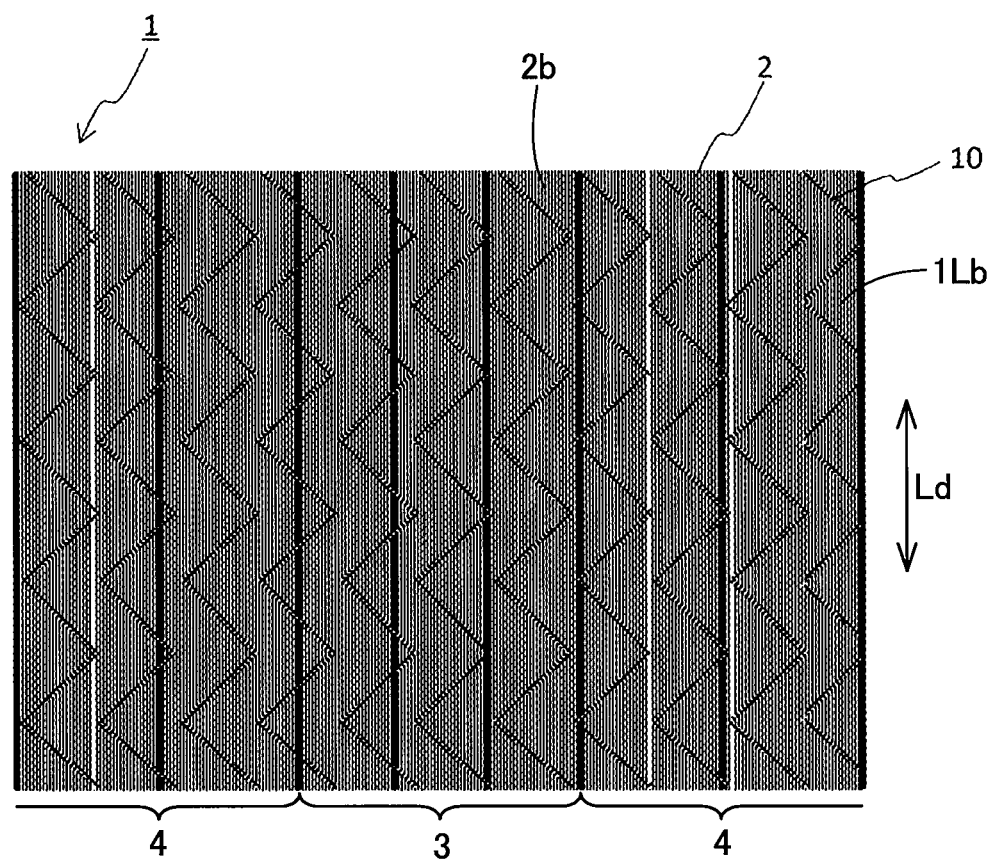

SHEET-LIKE REINFORCING FIBER BASE MATERIAL, PREFORM AND FIBER-REINFORCED RESIN MOLDED PRODUCT

TECHNICAL FIELD

This disclosure relates to a sheet-like reinforcing fiber base material used as a base material of a fiber-reinforced resin molded product, a preform using the sheet-like reinforcing fiber base material, and the fiber-reinforced resin molded product.

BACKGROUND

Fiber-reinforced plastics (FRP), especially carbon fiber reinforced plastics (CFRP) using carbon fibers, are light in weight and have excellent mechanical properties such as strength and rigidity. Accordingly, application of fiber-reinforced plastic members to transportation equipment has recently been expanded.

Resin transfer molding (RTM) has drawn attention and its application has been expanded as a method of manufacturing a fiber-reinforced resin molded product. RTM uses reinforcing fibers in the form of continuous fibers so that a produced fiber-reinforced resin molded product has high mechanical properties such as rigidity and strength. RTM enables the fiber-reinforced resin molded product to be molded in a shorter cycle time and has higher productivity, compared to a conventional method of molding a fiber-reinforced resin member using an autoclave.

RTM generally uses either (i) a fabric base material of reinforcing fiber bundles weaved by plain weaving, twill weaving or the like or (ii) a non-crimp base material in which reinforcing fiber bundles are arrayed and arranged in parallel, and are joined by stitching using an auxiliary thread or another technique to maintain its shape. Each of these fabric base material and non-crimp base material is configured as a reinforcing fiber base material produced in advance to be continuous in a longitudinal direction and have a fixed width and a fixed weight per unit area.

Cut base materials are cut out from the reinforcing fiber based material using various different cut patterns according to the shape and the physical properties of a desired fiber-reinforced resin molded product. The cut pattern basically has a shape as a planarly developed shape of the fiber-reinforced resin molded product that is to be molded. A plurality of cut base materials are arranged and stacked such that the respective cut base materials have orientations of reinforcing fibers in predetermined directions and have predetermined placement amounts of reinforcing fibers.

When the desired fiber-reinforced resin molded product has a solid shape, a stacked body is formed in approximately the same shape as the shape of the fiber-reinforced resin molded product using a shape-forming mold. In this process, a preform is produced by fixing the shape using a binder or the like applied on the reinforcing fiber base material. The preform is then placed in a mold. After the mold is closed, a liquid resin such as epoxy resin is injected into the mold such that the preform is impregnated with the resin, and the resin is then cured. This results in completing the fiber-reinforced resin molded product.

This method cuts out cut base materials having predetermined cut pattern shapes from a reinforcing fiber base material having a fixed width and continuous in the longitudinal direction. Unnecessary parts of the reinforcing fiber base material outside of the cut pattern are not used as molding members. The ratio of unnecessary parts increases when the shape of the cut pattern does not allow the cut base material to be efficiently cut out from the reinforcing fiber base material. This results in significantly decreasing the material yield and increasing the manufacturing cost of the member.

To solve this problem, for example, the technique of JP 2014-159099 A arrays and arranges a plurality of reinforcing fiber bundles in an area of a predetermined shape (corresponding to the shape of a cut pattern) on a sheet-like base material and bonds the arrayed reinforcing fiber bundles to produce a base material for production of a preform having the shape of the area. The technique of JP 2014-159099 A does not cut out a cut base material according to a predetermined cut pattern from a reinforcing fiber base material provided in advance but uses reinforcing fibers to directly produce a reinforcing fiber base material having a shape corresponding to the shape of the cut base material. Accordingly the technique of JP 2014-159099 A does not have the process of cutting out the cut base material and thereby reduces the waste of the material.

For the purpose of more effectively using the characteristics of a fiber-reinforced resin molded product that is light in weight and has excellent mechanical properties, strength and rigidity may be partly improved according to the required characteristics of the fiber-reinforced resin molded product. More specifically, the amount of reinforcing fibers is increased in part of the fiber-reinforced resin molded product. In that case, a typically employed method cuts out a cut base material for reinforcement having a shape of a region that is to be reinforced from a reinforcing fiber base material that is produced in advance to have a fixed width and a fixed weight per unit area, and additionally lays the cut base material for reinforcement on a cut base material.

For the purpose of providing appropriate reinforcement in a fiber-reinforced resin molded product, a cut base material for reinforcement may be required to be placed in an inner layer of a stacked body of reinforcing fiber base materials. In reinforcement by this method, the cut base material for reinforcement is cut out from the reinforcing fiber base material that is produced in advance. The remaining part other than the cut base material is unnecessary. That results in decreasing the material yield. Furthermore, the cut base material for reinforcement generally has a smaller shape relative to the entire shape of the fiber-reinforced resin molded product. The operation of adding the small cut base material for reinforcement in the process of stacking cut base materials having the planarly developed shape of the fiber-reinforced resin molded product is troublesome and decreases the productivity. Additionally, the cut base material for reinforcement that is partly arranged is likely to shift during shape-forming. That interferes with production with stable quality.

There is accordingly (i) a demand for a sheet-like reinforcing fiber base material that suppresses an increase in waste and suppresses reduction of the material yield in production of a fiber-reinforced resin molded product. There is (ii) a demand for a sheet-like reinforcing fiber base material that does not need to cut a reinforcing fiber base material for reinforcement for the purpose of partly improving the mechanical properties of a fiber-reinforced resin molded product and thereby suppresses reduction of the material yield. There is (iii) a demand for a sheet-like reinforcing fiber base material that readily places a reinforc-

SUMMARY

We thus provide:

(1) A sheet-like reinforcing fiber base material configured to maintain a sheet-like form by arraying and arranging reinforcing fiber bundles such that longitudinal directions thereof are one identical direction and restraining positions of adjacent reinforcing fiber bundles to each other, wherein a placement amount of reinforcing fibers is partly increased, and a placement weight of reinforcing fibers per unit area is non-uniform in the sheet-like reinforcing fiber base material.

(2) A sheet-like reinforcing fiber base material configured to maintain a sheet-like form by providing a layer of reinforcing fiber bundles arrayed and arranged such that longitudinal directions of the reinforcing fiber bundles are one identical direction, stacking two or more of the layers such that longitudinal directions of the reinforcing fiber bundles in the respective layers are different directions, and restraining positions of adjacent reinforcing fiber bundles to each other, wherein a placement amount of reinforcing fibers is partly increased, and a placement weight of reinforcing fibers per unit area is non-uniform in the sheet-like reinforcing fiber base material.

(3) The sheet-like reinforcing fiber base material described in either (1) or (2), the sheet-like reinforcing fiber base material having an outer peripheral shape that is an arbitrary shape determined according to a shape of a fiber-reinforced resin molded product that uses the sheet-like reinforcing fiber base material as the reinforcing fibers, wherein a region where the placement weight of the reinforcing fibers is non-uniform is determined according to a design requirement of the fiber-reinforced resin molded product.

(4) The sheet-like reinforcing fiber base material described in either (1) or (2), the sheet-like reinforcing fiber base material having an outer peripheral shape that is an arbitrary shape determined according to a solid shape of a fiber-reinforced resin molded product that uses the sheet-like reinforcing fiber base material as the reinforcing fibers, wherein a region where the placement weight of the reinforcing fibers is non-uniform is a region where the placement weight of the reinforcing fibers is decreased accompanied with transformation of the sheet-like reinforcing fiber base material according to the shape of the fiber-reinforced resin molded product.

(5) The sheet-like reinforcing fiber base material described in any one of (1) to (4), wherein the positions of the adjacent reinforcing fiber bundles are restrained to each other by a resin component binder.

(6) The sheet-like reinforcing fiber base material described in any one of (1) to (4), wherein the positions of the adjacent reinforcing fiber bundles are restrained to each other by stitching with an auxiliary thread.

(7) A reinforcing fiber base material preform that is formed and fixed in a solid shape by using two or more reinforcing fiber base materials that include at least one or more sheet-like reinforcing fiber base materials described in any one of (1) to (6), wherein a placement amount of reinforcing fibers is partly increased.

(8) A fiber-reinforced resin molded product that is obtained by impregnating the reinforcing fiber base material preform described in (7), in which the placement amount of the reinforcing fibers is partly increased, with a matrix resin and curing the matrix resin.

We also provide:

(1) A sheet-like reinforcing fiber base material is used to produce a fiber-reinforced resin molded product. The sheet-like reinforcing fiber base material comprises a first layer including a plurality of reinforcing fiber bundles that are arranged such that longitudinal directions thereof are approximately one identical direction and such that at least part of the reinforcing fiber bundles that are adjoined to each other are restrained to each other. The first layer includes: a first portion that includes a plurality of the reinforcing fiber bundles; and a second portion that includes a plurality of the reinforcing fiber bundles and has a larger weight of reinforcing fibers per unit area than a weight in the first portion.

This enables the fiber-reinforced resin molded product to be produced by using the sheet-like reinforcing fiber base material that is configured in advance to include a portion of the large weight of reinforcing fibers, without the cutting process. This configuration reduces the waste of the material in the process of producing the fiber-reinforced resin molded product. This configuration also provides reinforcement of the fiber-reinforced resin molded product without increasing the wasted material. Furthermore, this configuration allows for reinforcement at an accurate position in the process of molding the fiber-reinforced resin molded product.

(2) The sheet-like reinforcing fiber base material may further comprise a second layer including a plurality of reinforcing fiber bundles that are arranged such that longitudinal directions thereof are approximately one identical direction and such that at least part of the reinforcing fiber bundles that are adjoined to each other are restrained to each other. The first layer and the second layer may be stacked such that the longitudinal directions of the plurality of reinforcing fiber bundles respectively included in the first layer and the second layer are different from each other. At least part of the reinforcing fiber bundles included in the second layer may be at least partly restrained to the reinforcing fiber bundles included in the first layer. The second layer may include a third portion that is located at least partly at a position overlapping with the first portion and includes a plurality of the reinforcing fiber bundles; and a fourth portion that is located at least partly at a position overlapping with the second portion, includes a plurality of the reinforcing fiber bundles and has a larger weight of the reinforcing fibers per unit area than a weight in the third portion.

The sheet-like reinforcing fiber base material may be configured to include a plurality of layers. This reduces the number of processes performed to stack the sheet-like reinforcing fiber base materials to produce the fiber-reinforced resin molded product.

(3) The first layer may further include a first partial layer that is provided in the first portion and in the second portion and has a fixed weight of the reinforcing fibers per unit area; and a second partial layer that is not provided in the first portion but is provided in the second portion and has a fixed weight of the reinforcing fibers per unit area.

This performs the operation using the same reinforcing fiber bundles a plurality of times such as to produce the first portion and the second portion in the sheet-like reinforcing fiber base material. This accordingly facilitates production of the first portion and the second portion.

(4) The reinforcing fiber bundles in the second portion may be thicker than the reinforcing fiber bundles in the first portion.

This allows for an increase in amount of the reinforcing fibers with regard to part of the sheet-like reinforcing fiber base material.

(5) The plurality of reinforcing fiber bundles in the second portion may be arranged at a narrower interval than an interval of the plurality of reinforcing fiber bundles arranged in the first portion.

This produces the first portion and the second portion in the sheet-like reinforcing fiber base material by changing the interval of arrangement of the reinforcing fiber bundles, while using the same reinforcing fiber bundles. This accordingly facilitates production of the first portion and the second portion.

(6) The sheet-like reinforcing fiber base material may have an outer peripheral shape that is determined according to a shape of the fiber-reinforced resin molded product. The first portion and the second portion may be determined according to a design requirement of the fiber-reinforced resin molded product.

This increases the amount of reinforcing fibers placed in a portion of the sheet-like reinforcing fiber base material according to the design requirement of the fiber-reinforced resin molded product.

(7) The second portion may be a portion that forms a region of the fiber-reinforced resin molded product having at least one of a higher strength and a higher rigidity than a strength or a rigidity of a region formed by the first portion.

This increases the amount of reinforcing fibers placed in the portion of the sheet-like reinforcing fiber base material corresponding to the region of the fiber-reinforced resin molded product that requires a high strength or a high rigidity.

(8) The sheet-like reinforcing fiber base material may have an outer peripheral shape that is determined according to a shape of the fiber-reinforced resin molded product. The second portion may be a region where weight of the reinforcing fibers per unit area is reduced accompanied with transformation of the sheet-like reinforcing fiber base material that is formed in a shape according to a shape of the fiber-reinforced resin molded product.

This causes a large amount of reinforcing fibers to be placed in advance in the corresponding portion of the sheet-like reinforcing fiber base material to suppress the weight of reinforcing fibers per unit area from being significantly reduced in the region where the weight of reinforcing fibers per unit area is reduced accompanied with transformation of the sheet-like reinforcing fiber base material, compared to a remaining region.

(9) The second portion may be a portion that forms a region of the fiber-reinforced resin molded product having a larger curvature than a curvature of a region formed by the first portion.

A region of the fiber-reinforced resin molded product having a large curvature is a region expected to be significantly deformed and stretched in the process of production of the fiber-reinforced resin molded product. This configuration causes a large amount of reinforcing fibers to be placed in advance in the corresponding portion of the sheet-like reinforcing fiber base material to suppress the weight of reinforcing fibers per unit area from being significantly reduced in the region compared to a remaining region.

(10) The reinforcing fiber bundles adjoined to each other may be restrained to each other by a resin binder.

This enables reinforcing fiber bundles that are near to each other in any arbitrary direction in the sheet-like reinforcing fiber base material to be readily restrained.

(11) The reinforcing fiber bundles adjoined to each other may be stitched with an auxiliary thread.

This enables reinforcing fiber bundles that are near to each other in any arbitrary direction in the sheet-like reinforcing fiber base material to be restrained by appropriately setting a stitching technique.

(12) The reinforcing fiber bundle may be made of carbon fibers.

The sheet-like reinforcing fiber base material allows for production of a lightweight fiber-reinforced resin molded product.

(13) A preform comprises two or more reinforcing fiber base materials that include the sheet-like reinforcing fiber base material and that are formed in a solid shape and are fixed in the solid shape.

The reinforcing fiber base material may be configured to include a plurality of sheet-like reinforcing fiber base materials. This configuration reduces the number of processes performed to stack the reinforcing fiber base materials to produce the fiber-reinforced resin molded product.

(14) A fiber-reinforced resin molded product comprises the preform that is impregnated with a matrix resin that is cured.

This provides the fiber-reinforced resin molded product including a region of the increased amount of reinforcing fibers that is provided with high accuracy.

(15) A method of producing a fiber-reinforced resin molded product uses a sheet-like reinforcing fiber base material. This method comprises forming a unit layer. The forming of the unit layer comprises arraying a plurality of reinforcing fiber bundles such that longitudinal directions thereof are approximately one identical direction; and causing at least part of the reinforcing fiber bundles that are adjoined to each other to be restrained to each other. The arraying of the plurality of reinforcing fiber bundles comprises forming a first portion that includes a plurality of the reinforcing fiber bundles; and forming a second portion that includes a plurality of the reinforcing fiber bundles and has a larger weight of reinforcing fibers per unit area than a weight in the first portion.

This enables the fiber-reinforced resin molded product to be produced by using the sheet-like reinforcing fiber base material that is configured in advance to include a portion of the large weight of reinforcing fibers, without the cutting process. This configuration reduces the waste of the material in the process of producing the fiber-reinforced resin molded product. This configuration also provides reinforcement of the fiber-reinforced resin molded product without increasing the wasted material. Furthermore, this configuration allows for reinforcement at an accurate position in the process of molding the fiber-reinforced resin molded product.

(16) The method may further comprise forming a plurality of different unit layers by repeating the forming of the unit layer, such that the respective unit layers have different longitudinal directions of the plurality of reinforcing fiber bundles; and causing at least part of the reinforcing fiber bundles included in one unit layer out of the plurality of unit layers and at least part of the reinforcing fiber bundles included in another unit layer out of the plurality of unit layers to be at least partly restrained to each other. In at least two unit layers out of the plurality of unit layers, respective first portions may be at least partly overlapped with each other, and respective second portions may be at least partly overlapped with each other.

The sheet-like reinforcing fiber base material may be configured to include a plurality of layers. This reduces the number of processes performed to stack the sheet-like reinforcing fiber base materials to produce the fiber-reinforced resin molded product.

(17) Forming the unit layer may comprise providing a first partial layer having a fixed weight of the reinforcing fibers per unit area in the first portion and in the second portion; and not providing a second partial layer having a fixed weight of the reinforcing fibers per unit area in the first portion but providing the second partial layer in the second portion.

(18) Forming the second portion may comprise forming the second portion using the reinforcing fiber bundles that are thicker than the reinforcing fiber bundles used to form the first portion.

(19) Forming the second portion may comprise arranging the plurality of reinforcing fiber bundles at a narrower interval than an interval of the plurality of reinforcing fiber bundles arranged to form the first portion.

(20) The method may further comprise determining an outer peripheral shape of the sheet-like reinforcing fiber base material according to a shape of the fiber-reinforced resin molded product; and determining the first portion and the second portion according to a design requirement of the fiber-reinforced resin molded product.

The method may further comprise determining a portion that forms a region of the fiber-reinforced resin molded product having at least one of a higher strength and a higher rigidity than a strength or a rigidity of a region formed by the first portion, as the second portion.

(21) The method may further comprise determining an outer peripheral shape of the sheet-like reinforcing fiber base material according to a shape of the fiber-reinforced resin molded product; and identifying a portion of the sheet-like reinforcing fiber base material where weight of the reinforcing fibers per unit area is reduced accompanied with transformation of the sheet-like reinforcing fiber base material to the shape according to the shape of the fiber-reinforced resin molded product, and determining the identified portion as the second portion.

The method may further comprise determining a portion that forms a region of the fiber-reinforced resin molded product having a larger curvature than a curvature of a region formed by the first portion, as the second portion.

(22) The reinforcing fiber bundles adjoined to each other may be restrained by using a resin binder.

(23) The reinforcing fiber bundles adjoined to each other may be restrained by stitching with an auxiliary thread.

As described above, in the sheet-like reinforcing fiber base material, the placement amount of reinforcing fibers is increased or decreased in advance in a required portion. This causes the placement weight of reinforcing fibers per unit area to be non-uniform and enables a fiber-reinforced resin molded product that is partly reinforced to be readily manufactured without requirement of separately producing a reinforcing member and placing the reinforcing member in a stacked structure.

The outer peripheral shape is any arbitrary shape that is determined according to the shape of the fiber-reinforced resin molded product. This configuration suppresses a decrease in material yield by cutting the reinforcing fiber base material.

Additionally, when the reinforcing fiber base material is formed in a shape according to the shape of the fiber-reinforced resin molded product, transformation of the planar shape of the base material to a solid shape may cause a region where the placement amount of reinforcing fiber bundles is partly decreased. Placing in advance a larger amount of reinforcing fiber bundles in the region allows for production of the fiber-reinforced resin molded product where a required amount of reinforcing fibers is placed even after the transformation.

BRIEF DESCRIPTION OF THE DRAWINGS

FIG. 2 is a perspective view illustrating one example of a reinforcing fiber bundle placement apparatus 200 used to produce the sheet-like reinforcing fiber base material 1a.

FIG. 5A is a plan view illustrating another example of the method of restraining the positions of adjacent reinforcing fiber bundles 2 in a sheet-like reinforcing fiber base material 1.

Figure 1:
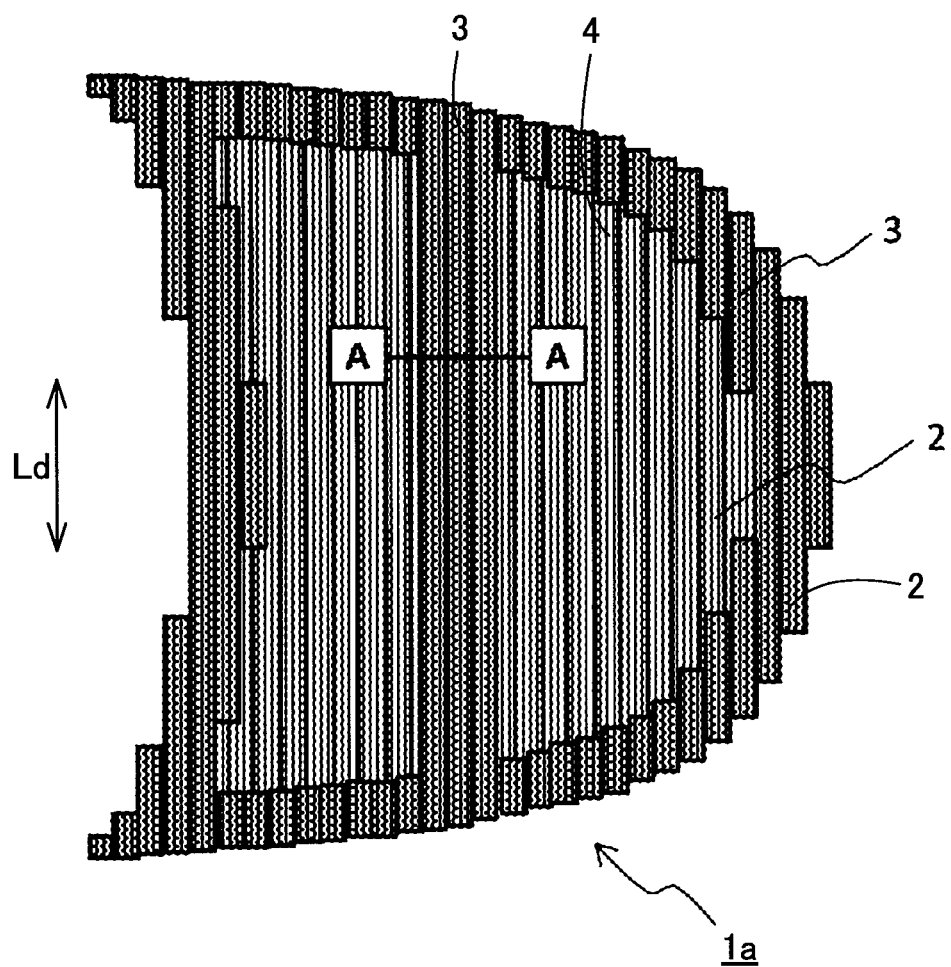
FIG. 1 is a plan view illustrating a sheet-like reinforcing fiber base material 1a according to one example.

REFERENCE SIGNS LIST 1, 1a, 1b, 1c, 1d . . . sheet-like reinforcing fiber base material 1La . . . unit layer (first layer)
1Lb . . . unit layer (second layer)
1p, 1q, 1r, 1s . . . cut base material
2, 2b, 2c . . . reinforcing fiber bundle
3 . . . second portion
4 . . . first portion
6 . . . stacked body of reinforcing fiber base materials
6C . . . stacked body of reinforcing fiber base materials
8 . . . resin binder
9 . . . fibrous resin
10 . . . auxiliary thread
11 . . . cloth-like material
12p-12t . . . cut base material
200 . . . reinforcing fiber bundle placement apparatus
205 . . . placement table
210 . . . head
Ld . . . longitudinal direction of reinforcing fiber
SL1 . . . first partial layer
SL2 . . . second partial layer

DETAILED DESCRIPTION

A. Configuration of Sheet-Like Reinforcing Fiber Base Material

FIG. 1 illustrates a sheet-like reinforcing fiber base material 1a according to an example. In the sheet-like reinforcing fiber base material 1a according to the example, reinforcing fiber bundles 2 are arrayed and arranged such that their longitudinal directions Ld are substantially the same direction. As a result, the sheet-like reinforcing fiber base material 1a provides a sheet-like form by the arrayed and arranged reinforcing fiber bundles 2.

The reinforcing fiber bundle 2 used is not specifically limited, but may be any reinforcing fiber bundle usable as reinforcing fibers of a fiber-reinforced resin. For example, carbon fibers or glass fibers may be used for the reinforcing fiber bundle 2. Using carbon fibers is especially preferable since this provides a fiber-reinforced resin member light in weight and having excellent mechanical properties. Several different reinforcing fiber bundles of different materials or of different varieties may be used in combination.

Figure 2:
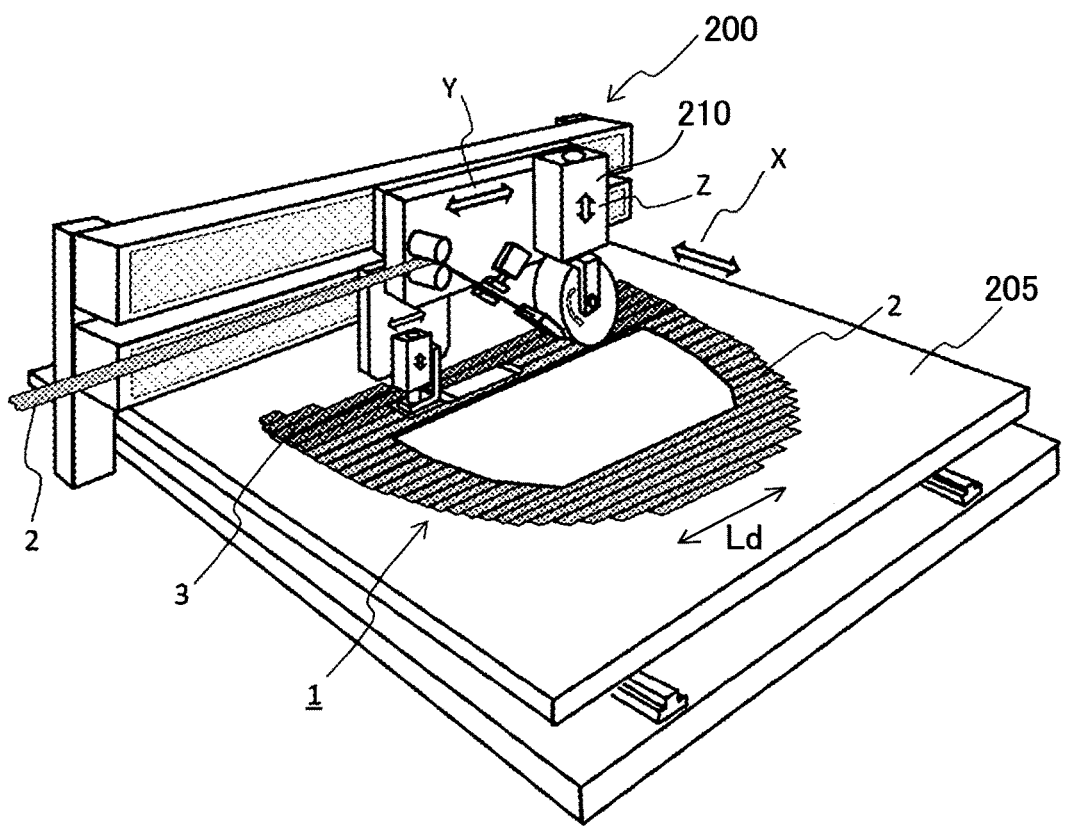

FIG. 2 is a perspective view illustrating one example of a reinforcing fiber bundle placement apparatus 200 used to manufacture the sheet-like reinforcing fiber base material 1a. The reinforcing fiber bundle placement apparatus 200 includes a placement table 205 that is movable in an X-axis direction and configured to support reinforcing fiber bundles, and a head 210 that is configured to place the reinforcing fiber bundles on the placement table 205. The head 210 is movable relative to the placement table 205 in a Y-axis direction and in a Z-axis direction. The X-axis direction, the Y-axis direction and the Z-axis direction are orthogonal to one another.

This configuration causes the head 210 to deliver the reinforcing fiber bundle to an arbitrary position on the placement table 205 and cut the delivered reinforcing fiber bundle at an arbitrary position on the placement table 205. The Y-axis direction is identical to a delivery direction of the reinforcing fiber bundle. As a result, the reinforcing fiber bundles are arrayed and arranged in the Y-axis direction on the placement table 205.

The reinforcing fiber bundles 2 are arrayed in a sheet-like form, for example, by the reinforcing fiber bundle placement apparatus 200 configured to draw the reinforcing fiber bundles 2 in one direction and arrange the reinforcing fiber bundles 2 on the placement table 205 as shown in FIG. 2. FIG. 2 illustrates the apparatus configured to array and arrange the reinforcing fiber bundles 2 in one direction. An apparatus configured to arrange reinforcing fiber bundles in any arbitrary direction may also be used. To manufacture the sheet-like reinforcing fiber base material at a low cost, it is desirable to use inexpensive, high-speed equipment of simple configuration. The sheet-like reinforcing fiber base material may be manufactured more efficiently by simultaneously drawing and placing a plurality of the reinforcing fiber bundles 2.

Respective ends of the respective arrayed reinforcing fiber bundles 2 are cut at predetermined positions. As a result, the arrayed reinforcing fiber bundles 2 form a sheet having a predetermined outer peripheral shape as a whole. This outer peripheral shape is determined according to the configuration of a target fiber-reinforced resin molded product. The outer peripheral shape of the arrayed reinforcing fiber bundles 2 is a planarly developed shape of the solid geometry of the fiber-reinforced resin molded product in principle. In terms of improving the product quality and the material yield, it is preferable to slightly modify the simply planarly developed shape by taking into account the behaviors of the respective parts of the sheet in the process of transforming the sheet-like reinforcing fiber base material to a solid geometry.

At least adjacent reinforcing fiber bundles 2 restrain their respective positions so that the arrayed reinforcing fiber bundles 2 maintain the sheet-like form. The method of restraining the reinforcing fiber bundles 2 is not specifically limited, but may be bonding with a binder of a resin component. The term "restrain" includes the state that displacements of respective positions are substantially not allowed and the state that displacements of respective positions are allowed in a predetermined range.

Figure 3A:
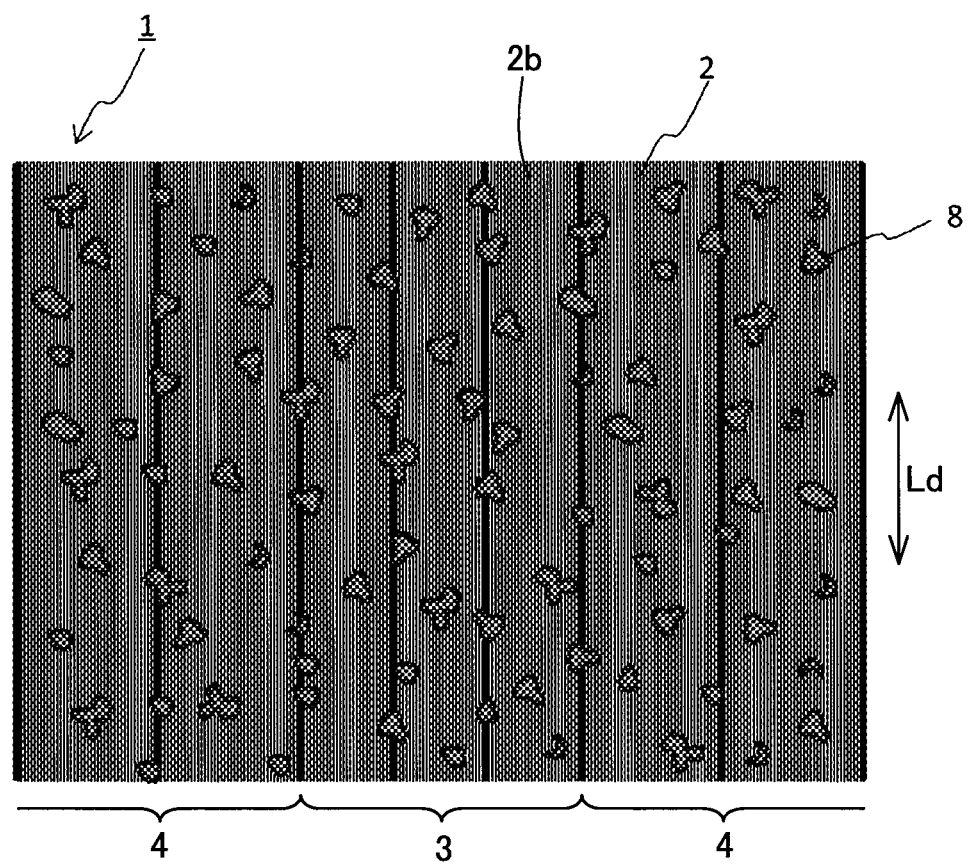
FIG. 3A is a plan view illustrating one example of a method of restraining the positions of adjacent reinforcing fiber bundles 2 to each other in a sheet-like reinforcing fiber base material 1.
Figure 3B:
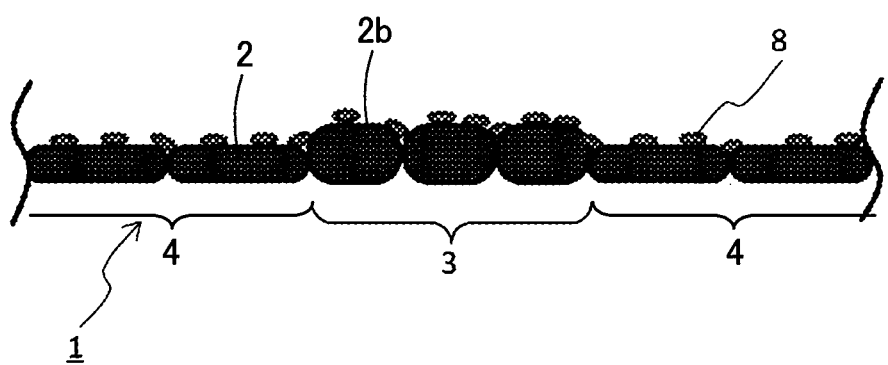
FIG. 3B is a sectional view illustrating the structure of the sheet-like reinforcing fiber base material 1 restrained by the restraining method of FIG. 3A.

FIG. 3A is a plan view illustrating one example of the method of restraining the positions of adjacent reinforcing fiber bundles 2 in a sheet-like reinforcing fiber base material 1. FIG. 3B is a sectional view illustrating the structure of the sheet-like reinforcing fiber base material 1 restrained by the restraining method of FIG. 3A. FIGS. 3A to 6B illustrate structures applicable to various sheet-like reinforcing fiber base materials, in addition to the sheet-like reinforcing fiber base material 1a shown in FIG. 1. Accordingly the sheet-like reinforcing fiber base material is expressed by a reference sign "1" in FIGS. 3A to 6B.

As shown in FIGS. 3A and 3B, a powdery resin binder 8 is spread on the reinforcing fiber bundles 2 that are arrayed and arranged, is melted by application of heat and is then cooled down to be solidified. As a result, this causes part of adjacent reinforcing fiber bundles 2 to be bonded to each other.

In FIG. 3B, reinforcing fiber bundles 2b are arranged at narrower intervals than the other reinforcing fiber bundles 2 and thereby have a sectional shape of the narrower width and the greater thickness than those of the sectional shape of the other reinforcing fiber bundles 2. The same applies to FIG. 4B, FIG. 5B and FIG. 6B. The reinforcing fiber bundle 2 denotes an entire reinforcing fiber bundle including the reinforcing fiber bundle 2b as well as a reinforcing fiber bundle having a sectional shape of the wider width and the less thickness than those of the sectional shape of the reinforcing fiber bundle 2b.

Figure 4A:
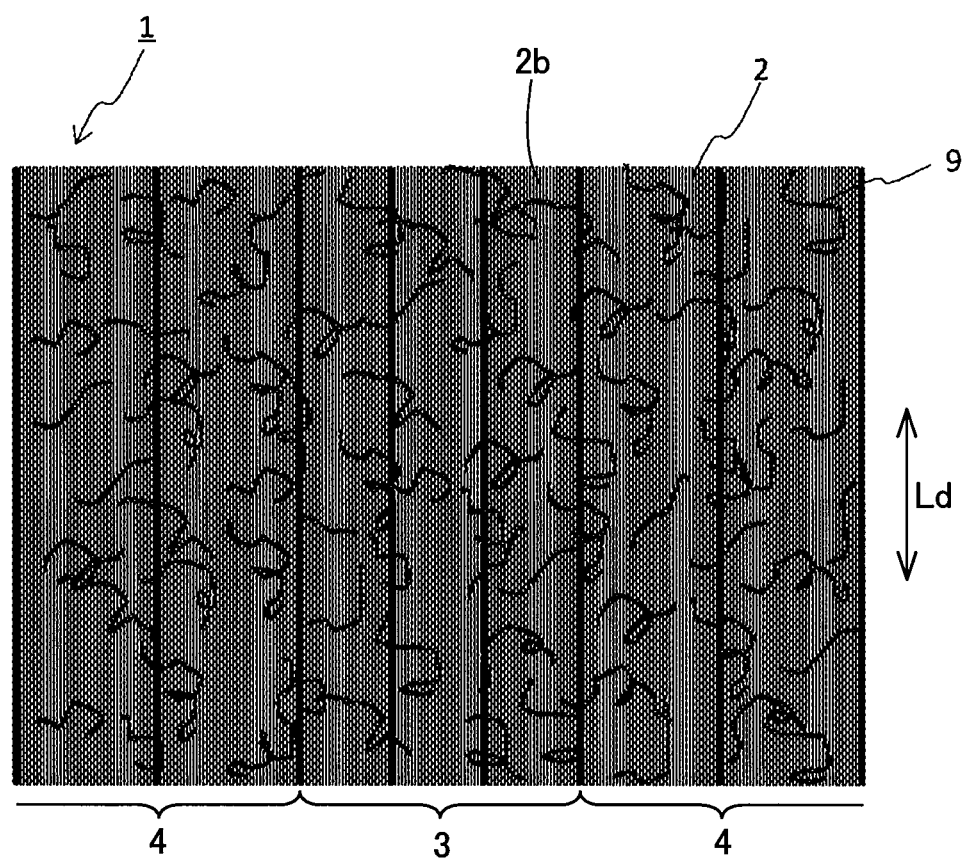
FIG. 4A is a plan view illustrating another example of the method of restraining the positions of adjacent reinforcing fiber bundles 2 in a sheet-like reinforcing fiber base material 1.
Figure 4B:
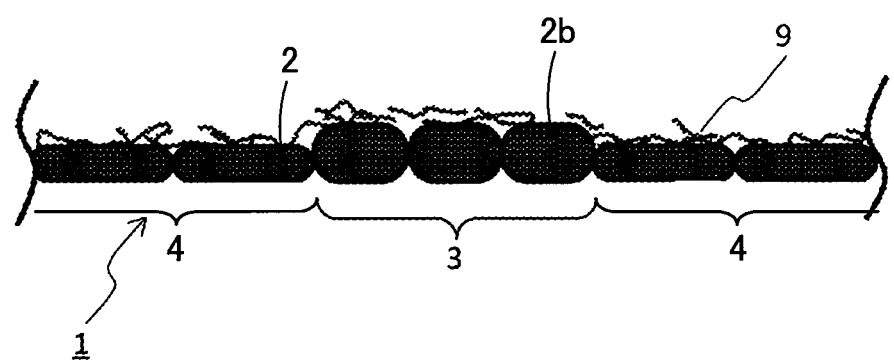
FIG. 4B is a sectional view illustrating the structure of the sheet-like reinforcing fiber base material 1 restrained by the restraining method of FIG. 4A.

FIG. 4A is a plan view illustrating another example of the method of restraining the positions of adjacent reinforcing fiber bundles 2 in a sheet-like reinforcing fiber base material 1. FIG. 4B is a sectional view illustrating the structure of the sheet-like reinforcing fiber base material 1 restrained by the restraining method of FIG. 4A. As shown in FIGS. 4A and 4B, the positions of adjacent reinforcing fiber bundles 2 may be restrained to each other by spreading a molten resin on arrayed and arranged reinforcing fiber bundles 2 and subsequently cooling down to solidify the resin in a fibrous form. The resin solidified in the fibrous form is shown by a reference sign 9 in FIGS. 4A and 4B.

Additionally, the positions of adjacent reinforcing fiber bundles 2 may also be restrained by each other by arraying and arranging reinforcing fiber bundles 2 with a resin component applied in advance on the surface thereof, melting the resin component and then solidifying the melted resin component.

Figure 5B:
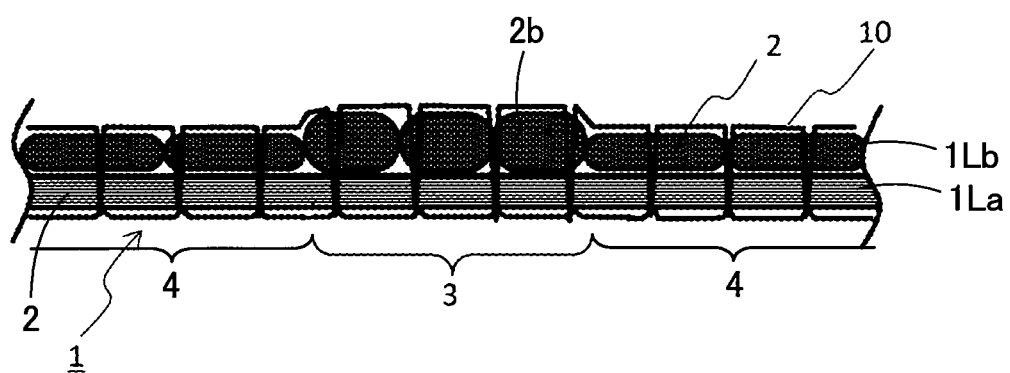
FIG. 5B is a sectional view illustrating the structure of the sheet-like reinforcing fiber base material 1 restrained by the restraining method of FIG. 5A.

FIG. 5A is a plan view illustrating another example of the method of restraining the positions of adjacent reinforcing fiber bundles 2 in a sheet-like reinforcing fiber base material 1. FIG. 5B is a sectional view illustrating the structure of the sheet-like reinforcing fiber base material 1 restrained by the restraining method of FIG. 5A. The sheet-like reinforcing fiber base material 1 shown in FIGS. 5A and 5B has a two-layer structure including a second layer 1Lb formed on a first layer 1La. This configuration reduces the number of processes to stack a large number of the sheet-like reinforcing fiber base materials 1 to produce a fiber-reinforced resin molded product. The number of layers to provide the sheet-like reinforcing fiber base material 1 is generally smaller than the number of the sheet-like reinforcing fiber base materials 1 that are stacked. This allows for positioning of the respective layers in the sheet-like reinforcing fiber base material 1 with high accuracy. The above configuration of the sheet-like reinforcing fiber base material enhances the accuracy of positions of respective layers in a produced fiber-reinforced resin molded product.

As shown in FIGS. 5A and 5B, the arrayed and arranged reinforcing fiber bundles 2 may be stitched with an auxiliary thread 10 to be joined with each other. The material of the auxiliary thread 10 is not specifically limited but may be, for example, glass fiber, polyester fiber or nylon fiber. The type of thread and the stitching technique are not limited, but may be any type and any technique that enable the positions of adjacent reinforcing fiber bundles 2 to be restrained to each other.

The method of joining the reinforcing fiber bundles 2 by stitching is especially effective to stack reinforcing fibers in two layers or more layers as shown in FIG. 5B. The configuration of FIG. 5B is implemented by providing a layer of reinforcing fibers arrayed and arranged such that longitudinal directions Ld of the respective reinforcing fibers are one identical direction, stacking two or more of the layers such that longitudinal directions Ld of the respective reinforcing fiber bundles 2 are different directions, and restraining the positions of adjacent reinforcing fiber bundles 2 and the positions of overlapping reinforcing fiber bundles 2 to each other.

Producing the sheet-like reinforcing fiber base material 1 having the shape maintained by restraining the positions of adjacent reinforcing fiber bundles 2 to each other reduces the possibility that the shape is changed in the process of conveying and stacking the sheet-like reinforcing fiber base materials 1. This also reduces the possibility that the respective reinforcing fiber bundles 2 move at random to decompose the base material 1 in the process of forming the base materials 1 to the shape of a fiber-reinforced resin molded product. This accordingly provides the sheet-like reinforcing fiber base material 1 that satisfies both easy handling and easy shape-forming.

The excessively weak binding force of the reinforcing fiber bundles 2 causes poor handling. The excessively strong binding force of the reinforcing fiber bundles 2 is, on the other hand, not preferable since this has adverse effects on transformation of the sheet-like reinforcing fiber base material 1 in the process of shape-forming the sheet-like reinforcing fiber base material 1. Accordingly, the restraining configuration and conditions that provide an appropriate level of binding force are preferable.

In the example of FIG. 5B, the amount of reinforcing fibers in a second portion 3 of the first layer 1La is equal to the amount of reinforcing fibers in a first portion 4 of the first layer 1La. According to a modification, reinforcing fiber bundles may be arranged in the first layer 1La such that the amount of reinforcing fibers in the second portion 3 is larger than the amount of reinforcing fibers in the first portion 4. To distinguish the first portion 4 and the second portion 3 of the first layer 1La of this modification from a first portion 4 and a second portion 3 of the second layer 1Lb, the first portion and the second portion of the second layer 1Lb may be respectively called "third portion" and "fourth portion". The third portion of the second layer 1Lb overlaps the first portion 4 of the first layer 1La. The fourth portion of the second layer 1Lb overlaps the second portion 3 of the first layer 1La.

Figure 6A:
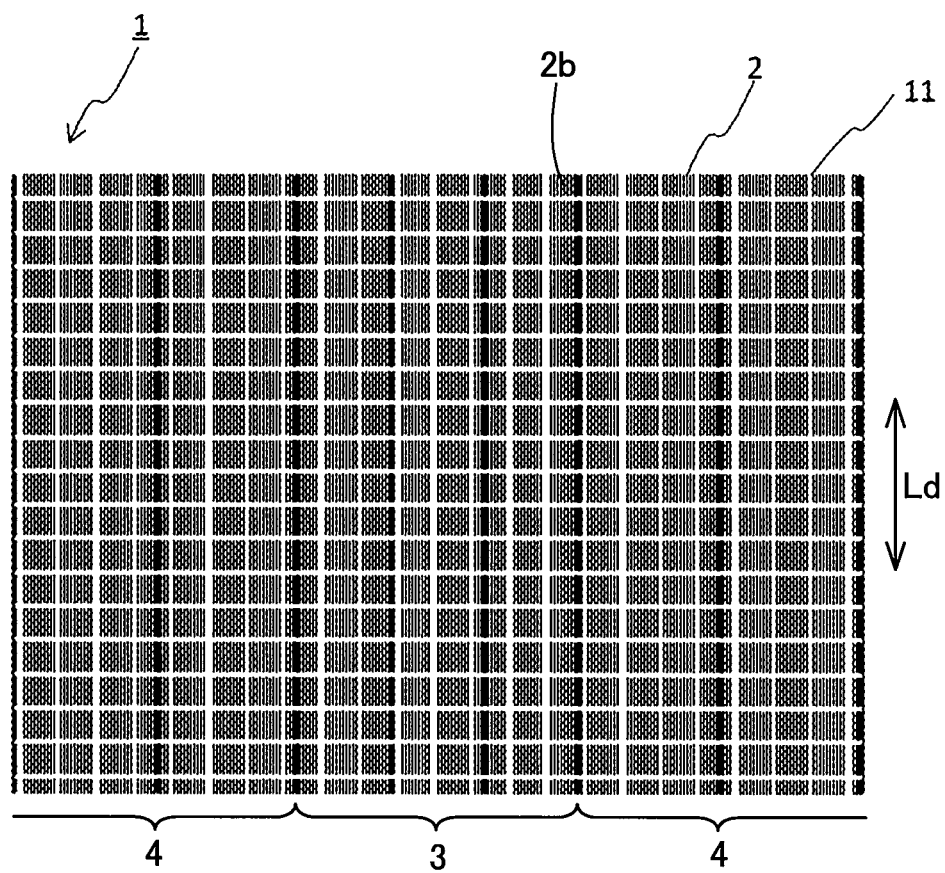
FIG. 6A is a plan view illustrating another example of the method of restraining the positions of adjacent reinforcing fiber bundles 2 in a sheet-like reinforcing fiber base material 1.
Figure 6B:
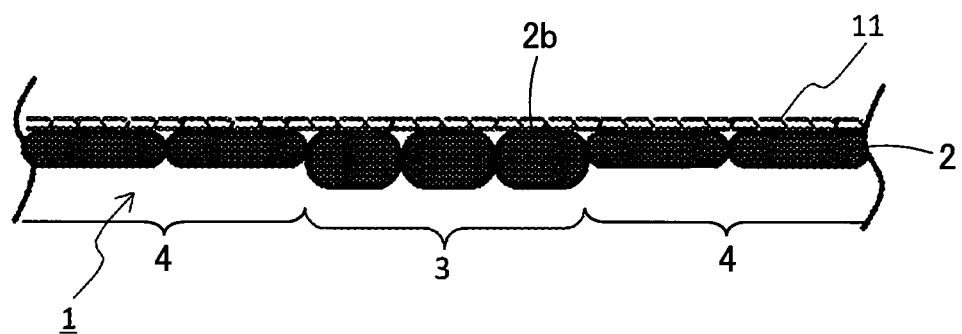
FIG. 6B is a sectional view illustrating the structure of the sheet-like reinforcing fiber base material 1 restrained by the restraining method of FIG. 6A.

FIG. 6A is a plan view illustrating another example of the method of restraining the positions of adjacent reinforcing fiber bundles 2 in a sheet-like reinforcing fiber base material 1. FIG. 6B is a sectional view illustrating the structure of the sheet-like reinforcing fiber base material 1 restrained by the restraining method of FIG. 6A. As shown in FIGS. 6A and 6B, a method of bonding a cloth-like material or a mesh material to arrayed reinforcing fiber bundles 2 may be employed to generate the binding force of the reinforcing fiber bundles 2. In the illustrated example, a cloth-like material 11 is bonded to reinforcing fiber bundles 2.

The cloth-like material 11 used may be, for example, unwoven fabric, woven fabric or knit fabric. The material bonded to the reinforcing fiber bundles 2 may be any material having a predetermined size (area) in two-dimensional directions and bondable to arrayed reinforcing fiber bundles 2. The material used for the cloth-like material or the mesh material is not specifically limited. When a thermoplastic resin material is used for the cloth-like material or the mesh material, the resin may be softened or melted to generate the binding force. The cloth-like material or the mesh material may be bonded to the reinforcing fiber bundles 2 by using an adhesive. The cloth-like material or the mesh material of the smaller weight per unit area has less effects on the physical properties of the fiber-reinforced resin molded product. The cloth-like material or the mesh material of excellent deformation capacity is preferable since it is unlikely to interfere with shape-forming performance of the sheet-like reinforcing fiber base material 1.

In the method of restraining the reinforcing fiber bundles 2 with the binder of the resin component (as shown in FIG. 3A to 4B) or in the method of restraining the reinforcing fiber bundles 2 using the thermoplastic cloth-like material or mesh material (as shown in FIGS. 6A and 6B), when the stacked sheet-like reinforcing fiber base materials 1 are formed to a shape of a member, the binder of the resin component or the thermoplastic cloth-like material or mesh material serves as an inter-layer binder to maintain the shape.

In the sheet-like reinforcing fiber base material 1, it is preferable to partly increase the placement amount of reinforcing fibers. A portion 3 of the partly increased amount is set corresponding to a portion where mechanical properties such as strength and rigidity are to be reinforced according to a design requirement of a fiber-reinforced resin member. One configuration of partly increasing the placement amount of reinforcing fibers is shown in FIG. 1. In FIG. 1, a portion of the sheet-like reinforcing fiber base material 1a having a smaller weight of reinforcing fibers per unit area is specified as a first portion 4, and a portion having a larger weight of reinforcing fibers per unit area than that of the first portion 4 is specified as a second portion 3.

The configuration of partly increasing the placement amount of reinforcing fibers is, however, not limited to the configuration of FIG. 1. The portion of the sheet-like reinforcing fiber base material 1a that is to be reinforced is determined according to the design requirement of the member and may be any of various portions such as a peripheral portion, a central portion or a local portion. For example, a portion of the sheet-like reinforcing fiber base material 1a that forms a region of the higher strength in a fiber-reinforced resin molded product than the strength of a region formed by the first portion 4 of the sheet-like reinforcing fiber base material 1a may be specified as the second portion 3 of the sheet-like reinforcing fiber base material 1a. A portion of the sheet-like reinforcing fiber base material 1a that forms a region of the higher rigidity in a fiber-reinforced resin molded product than the rigidity of a region formed by the first portion 4 of the sheet-like reinforcing fiber base material 1a may be specified as the second portion 3 of the sheet-like reinforcing fiber base material 1a. The "strength" is evaluated as the magnitude of a load that destroys an object portion of a fiber-reinforced resin molded product when a load is applied to the object portion under fixed conditions and gradually increasing the applied load. The "rigidity" is evaluated as the strain amount of an object portion of a fiber-reinforced resin molded product when a load is applied to the object portion under fixed conditions.

A portion of the sheet-like reinforcing fiber base material 1a forming a region of the larger curvature in a fiber-reinforced resin molded product than the curvature of a region formed by the first portion 4 of the sheet-like reinforcing fiber base material 1a may be specified as the second portion 3 of the sheet-like reinforcing fiber base material 1a. In production of a fiber-reinforced resin molded product of a solid shape from the sheet-like reinforcing fiber base material 1a, the portion of the larger curvature is more likely to be significantly deformed (stretched) in the process of molding. This portion is accordingly likely to have the decreased density of reinforcing fibers. The above configuration reduces the possibility that the density of the reinforcing fibers is decreased in the portion of the larger curvature.

The reinforced portion may be a most part of the sheet-like reinforcing fibers. In this case, it may be construed that the placement amount of the reinforcing fibers is partly decreased or more specifically is decreased in the first portion 4 in the sheet-like reinforcing fiber base material.

Figure 7:
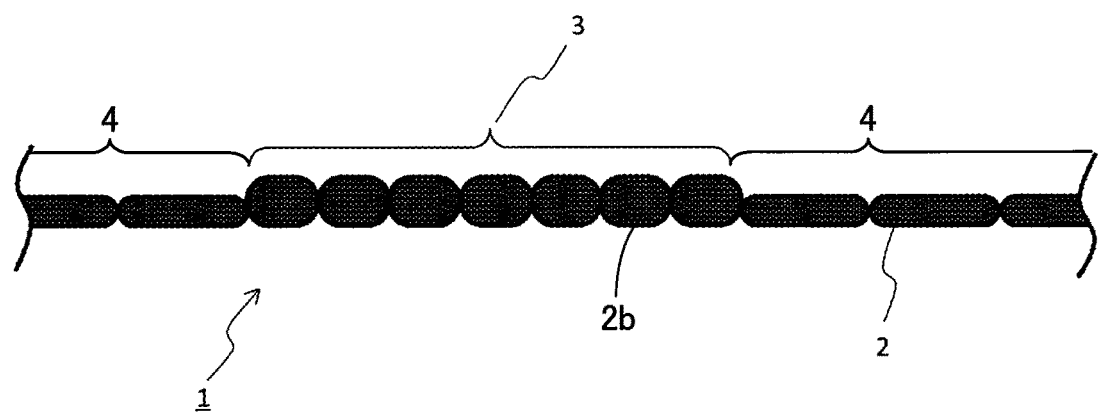
FIG. 7 is a sectional view illustrating one example of a method of partly increasing the amount of reinforcing fibers in the sheet-like reinforcing fiber base material.
Figure 8:
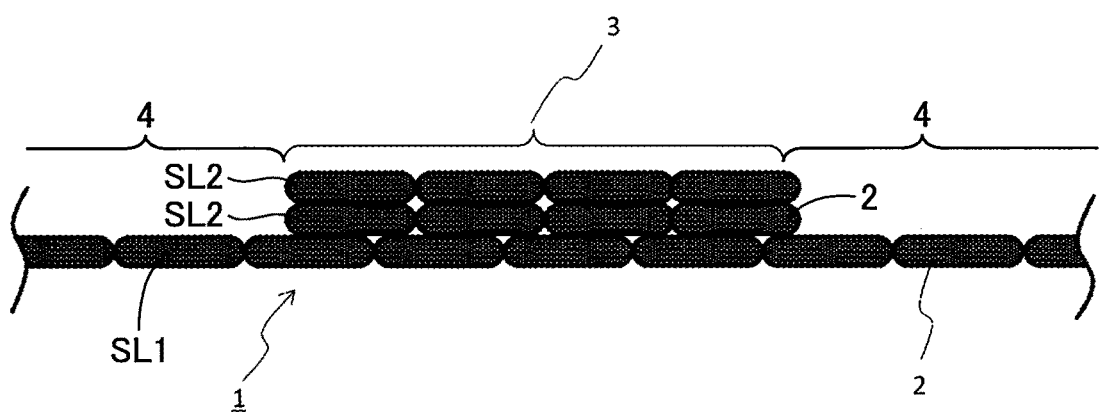
FIG. 8 is a sectional view illustrating another example of the method of partly increasing the amount of reinforcing fibers in the sheet-like reinforcing fiber base material.
Figure 9:
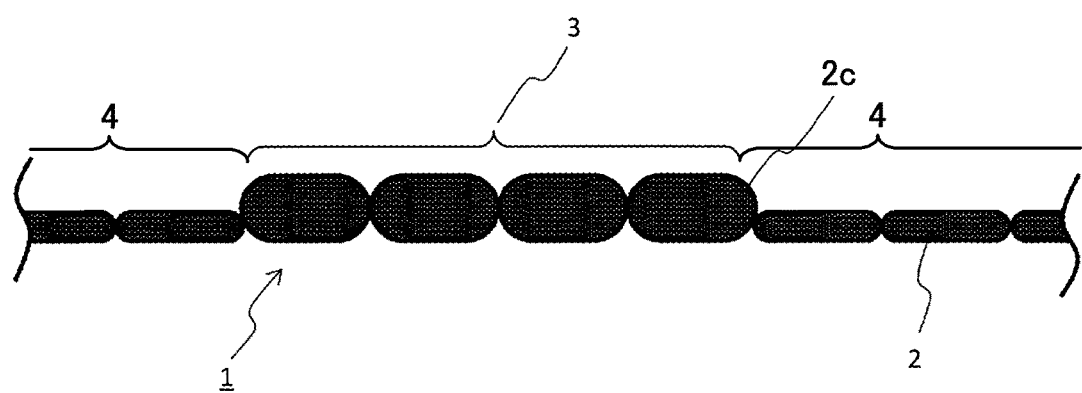
FIG. 9 is a sectional view illustrating another example of the method of partly increasing the amount of reinforcing fibers in the sheet-like reinforcing fiber base material.

FIG. 7 is a sectional view illustrating one example of the method of partly increasing the amount of reinforcing fibers in the sheet-like reinforcing fiber base material. FIG. 7 conceptually illustrates a sectional structure corresponding to an A-A section in FIG. 1. None of FIGS. 7 to 9 accurately reflect the dimensions of the respective parts. FIGS. 7 to 9 illustrate structures applicable to various sheet-like reinforcing fiber base materials, in addition to the sheet-like reinforcing fiber base material 1a shown in FIG. 1. Accordingly the sheet-like reinforcing fiber base material is also expressed by the reference sign "1" in FIGS. 7 to 9.

As shown in FIG. 7, a method of narrowing the pitch of arrangement of the reinforcing fiber bundles 2b may be employed in the second portion 3 where the amount of reinforcing fibers is to be increased, as the method of partly increasing the placement amount of reinforcing fibers. In FIG. 7, the second portion 3 has the narrower interval of the reinforcing fiber bundles 2b so that the sectional shape of the second reinforcing fiber bundles 2b has a narrower width and a greater thickness than the sectional shape of the reinforcing fiber bundles 2 in the first portion 4.

FIG. 8 is a sectional view illustrating another example of the method of partly increasing the amount of reinforcing fibers in the sheet-like reinforcing fiber base material. FIG. 8 conceptually illustrates a sectional structure corresponding to the A-A section in FIG. 1. As shown in FIG. 8, a method of placing the reinforcing fiber bundles 2 in an overlapping manner or the like may be employed to increase the placement density of the reinforcing fiber bundles 2 in the second portion 3 where the amount of reinforcing fibers is to be increased. As a result, the sheet-like reinforcing fiber base material 1 includes a first partial layer SL1 that is provided both in the first portion 4 and the second portion 3 and second partial layers SL2, SL2 that are not provided in the first portion 4 but are provided in the second portion 3. The first partial layer SL1 and the second partial layer SL2 are formed from the same reinforcing fiber bundles 2 and accordingly have identical, fixed weights of reinforcing fibers per unit area.

Another available method may widen the pitch of placement of the reinforcing fiber bundles 2 in the first portion 4 or may not place the reinforcing fiber bundles 2 in the first portion 4 to provide a part of the relatively increased placement amount of reinforcing fibers.

FIG. 9 is a sectional view illustrating another example of the method of partly increasing the amount of reinforcing fibers in the sheet-like reinforcing fiber base material. FIG. 9 conceptually illustrates a sectional structure corresponding to the A-A section in FIG. 1. As shown in FIG. 9, an employable method may use a thick thread having a larger number of single yarns included in the reinforcing fiber bundle as a reinforcing fiber bundle 2c placed in the second portion 3, compared to the number of single yarns included in the reinforcing fiber bundle 2 placed in the first portion 4.

Another employable method may, on the contrary, use a thin thread having a smaller number of single yarns included in the reinforcing fiber bundle as a reinforcing fiber bundle placed in the first portion 4, compared to the number of single yarns included in the reinforcing fiber bundle placed in the second portion 3. Two or more methods may be used in combination among the methods described above with reference to FIGS. 7 to 9.

B. Manufacture of Sheet-Like Reinforcing Fiber Base Material

As shown in FIGS. 3A to 4B and FIGS. 7 to 9, the sheet-like reinforcing fiber base material 1 may be produced by arraying and arranging the reinforcing fibers such that their longitudinal directions Ld are one identical direction and restraining the respective reinforcing fibers. This sheet-like reinforcing fiber base material includes a single layer of reinforcing fibers 1La.

The sheet-like reinforcing fiber base material may also be produced by (i) providing a layer of reinforcing fibers arrayed and arranged such that longitudinal directions Ld of the respective reinforcing fibers are one identical direction and stacking two or more of the layers such that longitudinal directions Ld of the respective reinforcing fiber bundles 2 are different directions and (ii) restraining the positions of adjacent reinforcing fiber bundles 2 and the positions of overlapping reinforcing fiber bundles 2 to each other. An example of this configuration is the first layer 1La and the second layer 1Lb having different directions Ld of the reinforcing fiber bundles 2 as shown in FIGS. 5A and 5B.

The term "adjacent" herein is not limited to the state that reinforcing fiber bundles 2 of one identical sheet-like reinforcing fiber base material are arrayed approximately parallel to each other to be adjacent to each other but also includes the state that reinforcing fiber bundles included in two sheet-like reinforcing fiber base materials (1La and 1Lb shown in FIG. 5B) that are adjoined to each other are adjacent to each other (adjacent to each other in the stacking direction) in a stacked body of sheet-like reinforcing fiber base materials. In other words, the state that reinforcing fiber bundles are "adjacent to each other" denotes a relationship between two reinforcing fiber bundles that no other reinforcing fiber bundle is present between the two reinforcing fiber bundles.

The "overlapping reinforcing fiber bundles" are not limited to a relationship of two reinforcing fiber bundles that are adjacent to each other in the stacking direction, but also include a relationship of three or more reinforcing fiber bundle groups, each group being provided as a set of reinforcing fiber bundles adjacent in the stacking direction.

In this case, for example, a method of using a resin binder (as shown in FIG. 3A to 4B) or a method of stitching with an auxiliary thread (as shown in FIGS. 5A and 5B) described above may be employed as a means to restrain the positions of adjacent reinforcing fiber bundles and overlapping reinforcing fiber bundles to each other.

The configuration of one sheet-like reinforcing fiber base material by stacking two or more layers such that the longitudinal directions of the respective reinforcing fiber bundles 2 are different directions (as shown in FIGS. 5A and 5B) exerts the following advantageous effects. This configuration reduces the number of stacking operations in the process of stacking a plurality of sheet-like reinforcing fiber base materials to produce a reinforcing fiber base material and further stacking the reinforcing fiber base materials. The reinforcing fiber bundles 2 in two different directions are restrained to each other in one sheet-like reinforcing fiber base material. This configuration reduces the possibility that the sheet-like reinforcing fiber base material is frayed or that the position of the reinforcing fiber bundle 2 is shifted in the process of molding the reinforcing fiber base material to produce a preform. As a result, this enables the configuration of the sheet-like reinforcing fiber base material to be maintained more stably.

The sheet-like reinforcing fiber base material having such a multi-layer structure may be produced by the following examples. A first example arrays and arranges reinforcing fiber bundles 2 in one direction, and subsequently arrays and arranges reinforcing fiber bundles 2 in a different direction on the arrayed reinforcing fiber bundles 2 in the one direction. The first example then restrains the positions of the respective reinforcing fiber bundles 2 to each other.

A second example provides an intermediate product by arraying and arranging reinforcing fiber bundles 2 in one direction and restraining the positions of adjacent reinforcing fiber bundles 2 to each other. The second example subsequently stacks two or more layers of the intermediate product and restrains the positions of overlapping reinforcing fiber bundles 2 to each other by using a binder or by stitching such as to obtain a sheet-like reinforcing fiber base material having a multi-layer structure.

It is also preferable to perform the following process in design of a fiber-reinforced resin molded product. In shape-forming according to the shape of a fiber-reinforced resin molded product, the positions of the reinforcing fiber bundles 2 included in the sheet-like reinforcing fiber base material may be shifted in the course of transformation from a planar shape to a solid shape and may result in decreasing the placement amount of reinforcing fibers. The process identifies in advance a portion of a reinforcing fiber base material where a decrease in placement amount of reinforcing fibers is expected and places a larger amount of reinforcing fibers in a portion of the sheet-like reinforcing fiber base material corresponding to the identified portion of the reinforcing fiber base material, compared to the placement amount in the remaining portion (as shown in FIGS. 7 to 9).

When the reinforcing fiber base material is formed in a shape with significant concaves and convexes, the placement amount of reinforcing fibers is likely to be decreased in part of the shape-formed reinforcing fiber base material. This may result in failing to provide the mechanical properties as designed. Performing the above process, however, enables a required placement amount of reinforcing fibers to be maintained after shape-forming and thereby ensures the mechanical properties as designed.

A preform may be produced by stacking two or more sheet-like reinforcing fiber base materials that include at least one sheet-like reinforcing fiber base material processed as described above such as to form a reinforcing fiber base material, forming the reinforcing fiber base material to approximately the same shape as that of a fiber-reinforced resin molded product and fixing the shape.

Performing this process enables a preform in which a required amount of reinforcing fibers is placed in a required region to be readily produced without requiring placement of a reinforcing member in a stacked body with high positional accuracy.

A fiber-reinforced resin molded product may be molded by using such a sheet-like reinforcing fiber base material or a preform.

The following describes a concrete method of producing the fiber-reinforced resin molded product with reference to the drawings.

Figure 10:
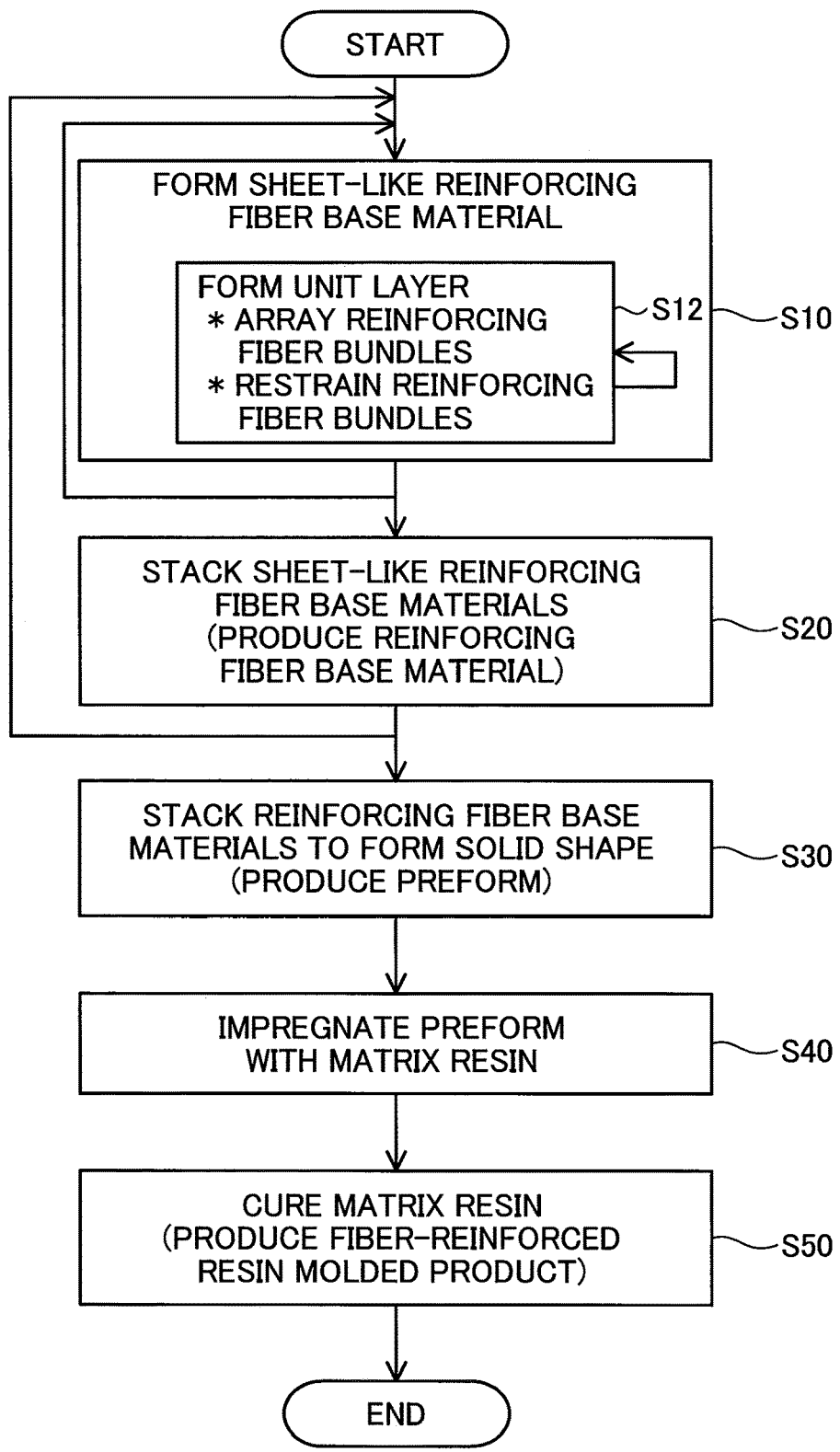
FIG. 10 is a flowchart showing a process of manufacturing a fiber-reinforced resin molded product.

FIG. 10 is a flowchart showing a process of manufacturing a fiber-reinforced resin molded product. At step S10, a sheet-like reinforcing fiber base material is produced. More specifically, at step S12, reinforcing fiber bundles are arrayed and arranged such that their longitudinal directions LD are approximately the same direction by using the reinforcing fiber bundle placement apparatus 200 shown in FIG. 2. The reinforcing fiber bundles are arrayed, such that a larger amount of reinforcing fibers is placed in the second portion 3 than the amount of reinforcing fibers placed in the first portion 4 (also shown in FIG. 1), by one or more methods among the methods described above with reference to FIGS. 7 to 9.

At step S12, adjacent reinforcing fiber bundles are then restrained to each other by one or more methods among the methods described above with reference to FIGS. 3A to 6B. As a result, this provides, for example, a unit layer 1La forming the sheet-like reinforcing fiber base material 1a shown in FIG. 1.

At step S10 in FIG. 10, formation of the unit layer (step S12) is performed one or more times. When formation of the unit layer is performed two or more times, one or more new unit layers are formed in a region overlapping with a previously formed unit layer 1La. For example, one or more new unit layers are formed in a region that is identical to the region of a previously formed unit layer 1La. At least one of the newly formed unit layers includes reinforcing fiber bundles 2 of a different arrangement (i.e., orientation of longitudinal directions Ld) from the arrangement of reinforcing fiber bundles 2 in the previously formed unit layer 1La. A plurality of unit layers formed at step S10 may include two or more unit layers having the same arrangement of reinforcing fiber bundles.

In at least two or more unit layers among the plurality of unit layers formed by repeating formation of the unit layer (step S12), the second portions 3 having the larger amount of reinforcing fibers are located to be at least partly overlapped with each other. In at least two or more unit layers, the first portions 4 having the smaller amount of reinforcing fibers are located to be at least partly overlapped with each other. In a projection of the plurality of unit layers including the first portions 4 and the second portions 3 in the stacking direction, it is preferable that the regions of the first portions 4 are identical to one another and the regions of the second portions 3 are also identical to one another in the respective unit layers.

At step S10, at least part of the reinforcing fiber bundles included in one unit layer 1La out of the plurality of unit layers thus formed and at least part of the reinforcing fiber bundles included in another unit layer 1Lb are restrained to each other at least partly (for example, as shown in FIGS. 5A and 5B). This produces the sheet-like reinforcing fiber base material 1 including one or more unit layers.

Step S10 of FIG. 10 is performed one or more times. When step S10 is performed two or more times, at least one of newly formed sheet-like reinforcing fiber base materials includes reinforcing fiber bundles of a different arrangement (i.e., orientation of longitudinal directions Ld) from the arrangement of reinforcing fiber bundles in a previously formed sheet-like reinforcing fiber base material. A plurality of sheet-like reinforcing fiber base materials formed at step S10 may include two or more sheet-like reinforcing fiber base materials having the same arrangement of reinforcing fiber bundles.

Figure 11:
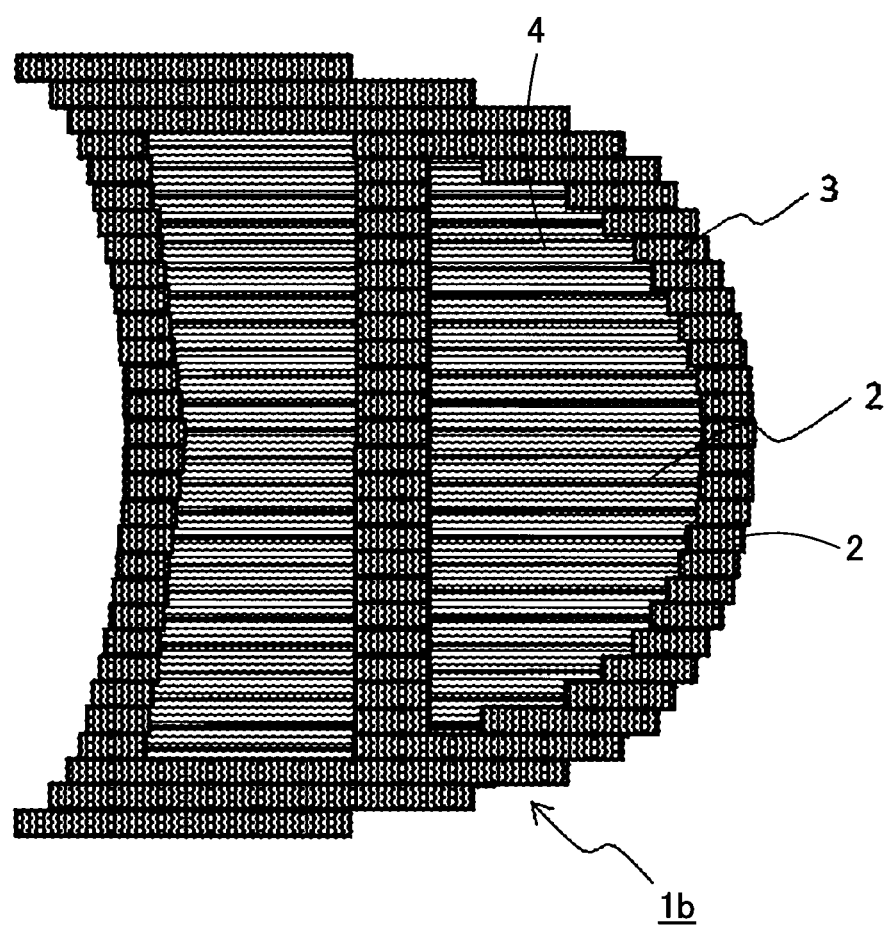
FIG. 11 is a plan view illustrating a sheet-like reinforcing fiber base material 1b according to one example.
Figure 12:
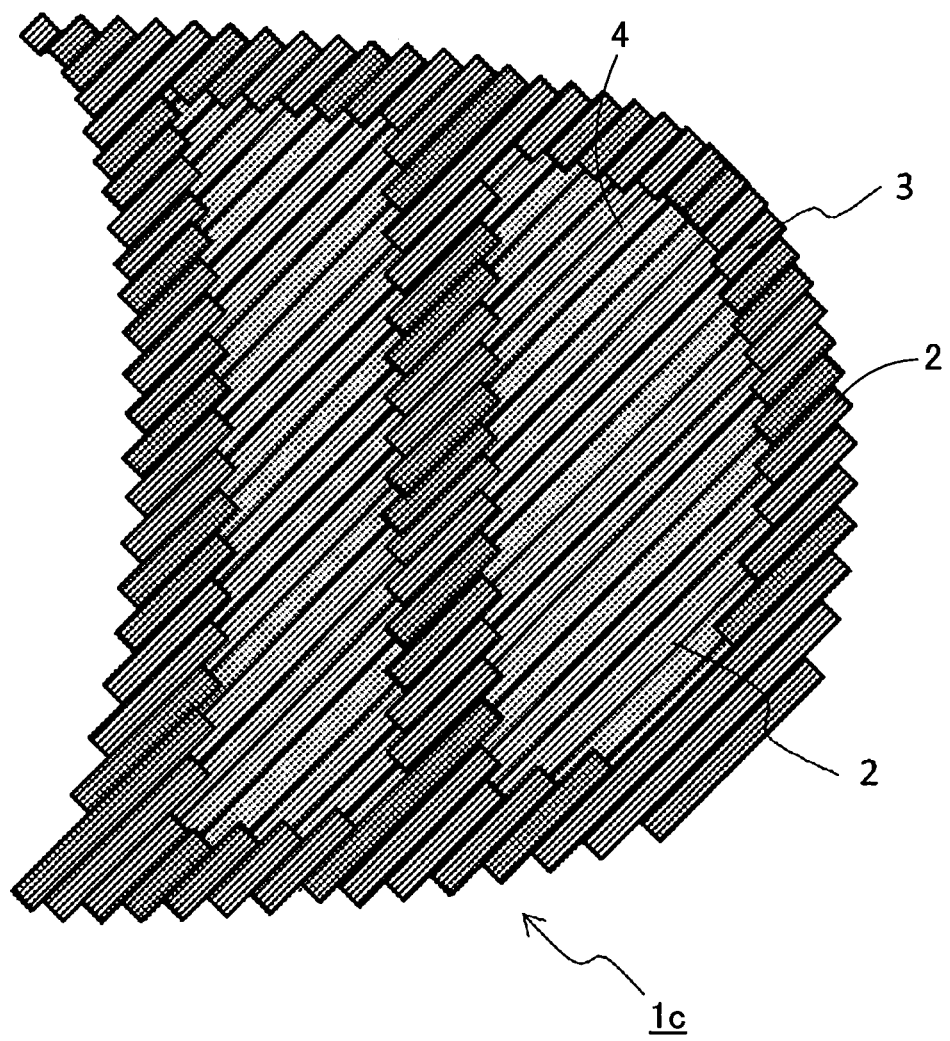
FIG. 12 is a plan view illustrating a sheet-like reinforcing fiber base material 1c according to one example.

In at least two or more sheet-like reinforcing fiber base materials among the plurality of sheet-like reinforcing fiber base materials (as shown in FIG. 1, FIG. 11 or FIG. 12) formed by repeating step S10, the second portions 3 having the larger amount of reinforcing fibers are located to be at least partly overlapped with each other in the stacked sheet-like reinforcing fiber base materials. In at least two or more sheet-like reinforcing fiber base materials, the first portions 4 having the smaller amount of reinforcing fibers are located to be at least partly overlapped with each other in the stacked sheet-like reinforcing fiber base materials.

FIG. 11 is a plan view illustrating a sheet-like reinforcing fiber base material 1b according to one example. FIG. 12 is a plan view illustrating a sheet-like reinforcing fiber base material 1c according to one example. The sheet-like reinforcing fiber base materials 1b and 1c have different directions of reinforcing fiber bundles 2 from that of the sheet-like reinforcing fiber base material 1a shown in FIG. 1. The other configurations of the sheet-like reinforcing fiber base materials 1b and 1c are similar to the configuration of the sheet-like reinforcing fiber base material 1a. The sectional structures of the sheet-like reinforcing fiber base materials 1a to 1c are as illustrated in FIG. 8. In FIGS. 11 and 12, the like components corresponding to those shown in FIG. 1 are shown by the like reference sign. In projection in the stacking direction, the respective regions of first portions 4 are identical to one another, and the respective regions of second portions 3 are identical to one another in the sheet-like reinforcing fiber base materials 1a to 1c.

At step S20 in FIG. 10, the sheet-like reinforcing fiber base materials (as shown in FIG. 1, FIG. 11 or FIG. 12) formed at step S10 are stacked. This results in producing a reinforcing fiber base material. A sheet-like reinforcing fiber base material 1d has a different orientation of reinforcing fiber bundles 2 from those of the sheet-like reinforcing fiber base materials 1a to 1c. The other configuration of the sheet-like reinforcing fiber base material 1d is similar to the configuration of the sheet-like reinforcing fiber base material 1a. In the sheet-like reinforcing fiber base materials 1a, 1b, 1c and 1d, the second portions 3 are located to be overlapped with each other. A specific region of the reinforcing fiber base material corresponding to the second portions 3 accordingly includes a larger amount of reinforcing fibers, compared to a remaining region.

When step S10 is performed only once, the reinforcing fiber base material produced at step S20 is equal to the sheet-like reinforcing fiber base material formed at step S10. In other words, in this case, no processing is performed at step S20.

The combination of step S10 and step S20 of FIG. 10 is performed one or more times. This results in producing one or more reinforcing fiber base materials.

Figure 13:
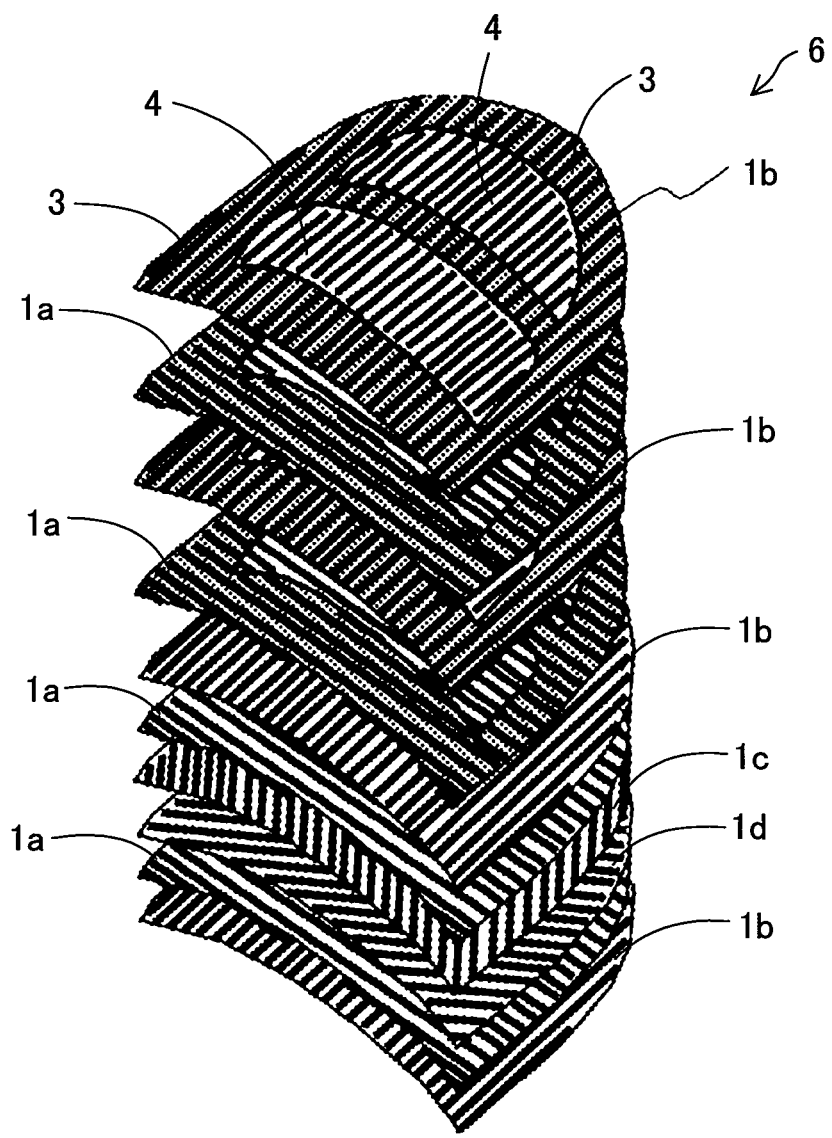
FIG. 13 is a conceptual view illustrating a process of stacking reinforcing fiber base materials to produce a stacked body of reinforcing fiber base materials 6.

FIG. 13 is a conceptual view illustrating a process of stacking reinforcing fiber base materials to produce a stacked body of reinforcing fiber base materials 6. In this illustrated example, the reinforcing fiber base material produced at step S20 of FIG. 10 is any of the sheet-like reinforcing fiber base materials 1a, 1b, 1c and 1d and stacking of the sheet-like reinforcing fiber base materials was not performed at step S20.

At step S30 of FIG. 10, as shown in FIG. 13, the reinforcing fiber base materials (sheet-like reinforcing fiber base materials 1a, 1b, 1c and 1d) produced at step S20 are stacked. This results in producing the stacked body of reinforcing fiber base materials 6.

Figure 14:
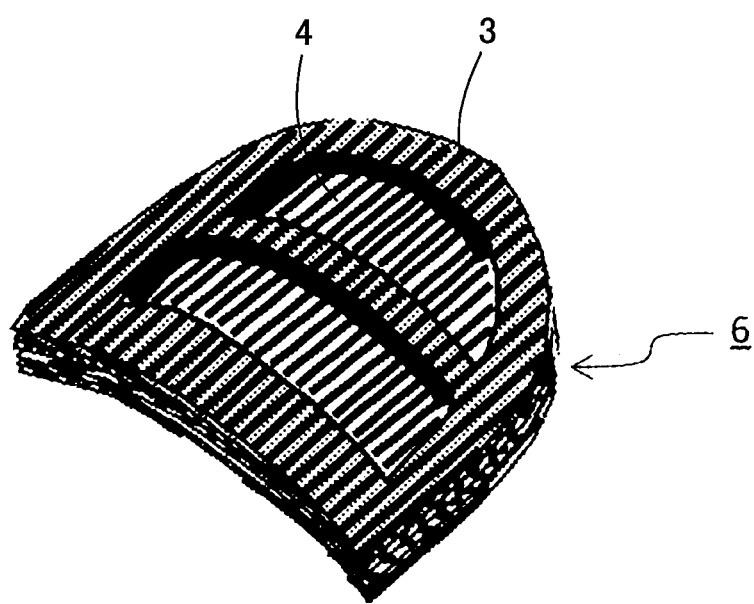
FIG. 14 is a perspective view illustrating the stacked body of reinforcing fiber base materials 6.

FIG. 14 is a perspective view illustrating the stacked body of reinforcing fiber base materials 6. The second portions 3 are located to overlap each other in the sheet-like reinforcing fiber base materials 1a, 1b, 1c and 1d serving as the reinforcing fiber base materials. A specific region of the stacked body of reinforcing fiber base materials 6 corresponding to the second portions 3 accordingly includes a larger amount of reinforcing fibers, compared to a remaining region.

At step S30 of FIG. 10, the stacked body of reinforcing fiber base materials 6 is formed in a shape using a mold. More specifically, the stacked body of reinforcing fiber base materials 6 is formed from a planar shape to a three-dimensional shape without removal work such as cutting. The shape of the stacked body of reinforcing fiber base materials 6 is then fixed with a binder. This results in producing a preform.

At step S40, the preform is placed in a mold. After the mold is closed, a liquid resin such as epoxy resin is injected into the mold. This resin serves as a matrix resin in a fiber-reinforced resin molded product as a finished product.

At step S50, the resin with which the preform is impregnated is cured. This results in producing a fiber-reinforced resin molded product. The resin used to fix the relative positions of reinforcing fibers in the fiber-reinforced resin molded product is called "matrix resin". The matrix resin includes resins used at steps S10, S20 and S40 in FIG. 10, in addition to the resin used at step S50 in FIG. 10.

Figure 15:
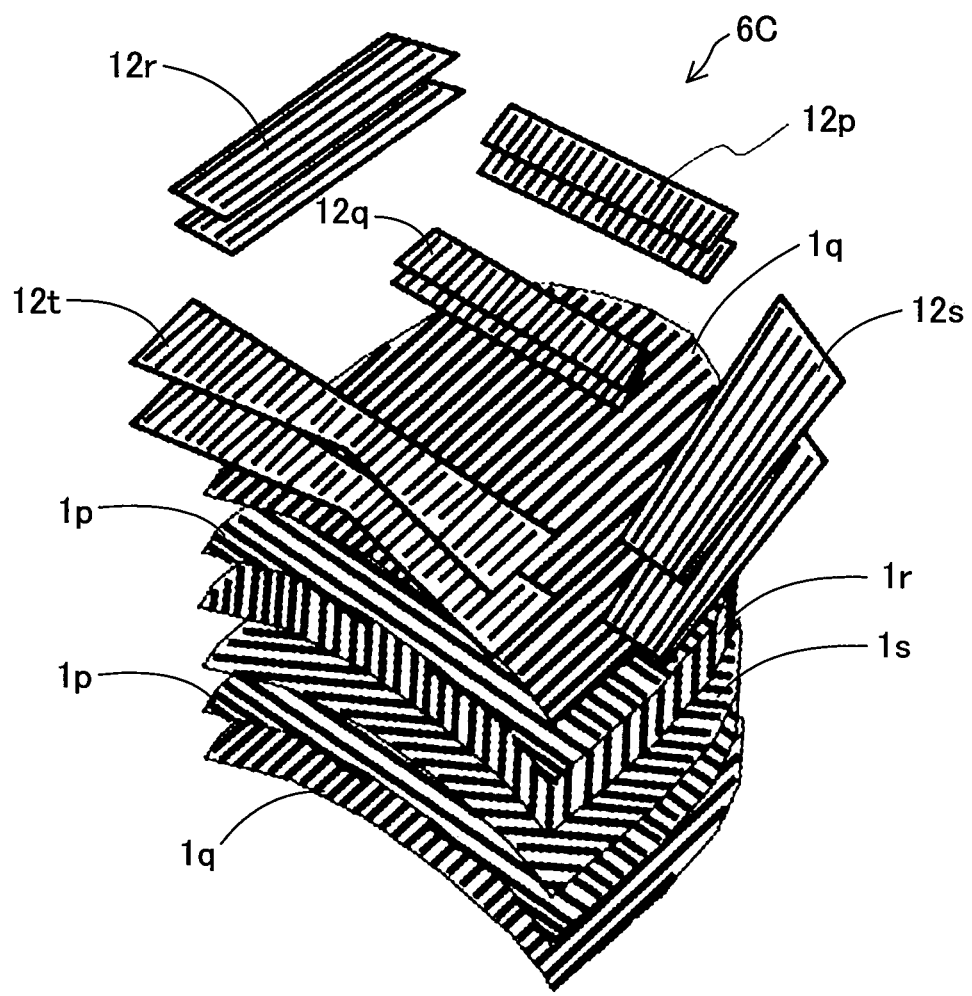
FIG. 15 is a conceptual view illustrating a method of producing a stacked body of reinforcing fiber base materials 6C according to a comparative example.

FIG. 15 is a conceptual view illustrating a method of producing a stacked body of reinforcing fiber base materials 6C according to a comparative example. In the comparative example, cut base materials 1p, 1q, 1r and 1s having approximately the same outer shapes are stacked. To reinforce part of a fiber-reinforced resin molded product as a finished product, cut base materials 12p to 12t for reinforcement are further stacked according to the shapes of regions that are to be reinforced. The cut base materials 12p to 12t for reinforcement are cut out from a reinforcing fiber base material that is produced in advance to have a fixed width and a fixed weight per unit area.

In the comparative example, the cut base materials 12p to 12t for reinforcement are cut out from the reinforcing fiber base material that is produced in advance to have a fixed width and a fixed weight per unit area. This configuration gives non-used part of the base material and provides a low material yield.

In the sheet-like reinforcing fiber base material according to the example, however, the layer of the sheet-like reinforcing fiber base material having the outer shape determined according to the shape of the fiber-reinforced resin molded product and the structure provided for reinforcement are formed without the cutting process (as shown in FIG. 2). This configuration (i) reduces the waste of the material in production of the fiber-reinforced resin molded product and (ii) provides reinforcement of the fiber-reinforced resin molded product without increasing the wasted material.

After formation of the layer structure including the first portion and the second portion, these layer structures having approximately the same outer shapes are stacked (as shown in FIG. 13). This configuration accordingly (iii) reduces the possibility that the position of the reinforcing fiber base material for reinforcement is shifted during molding of the fiber-reinforced resin molded product.

INDUSTRIAL APPLICABILITY

The sheet-like reinforcing fiber base material is preferably used to manufacture a fiber-reinforced resin molded product that is light in weight and has excellent mechanical properties, with a high efficiency and a high quality.

The invention claimed is:

1. A sheet like sheet shaped reinforcing fiber base material used to produce a fiber-reinforced resin molded product, the sheet like sheet shaped reinforcing fiber base material comprising:
   a first layer including a plurality of reinforcing fiber bundles arranged such that longitudinal directions thereof are approximately one identical direction and such that at least part of the reinforcing fiber bundles adjoined to each other are restrained with respect to each other, wherein
   the first layer includes:
      a first portion that includes a plurality of the reinforcing fiber bundles; and
      a second portion that includes a plurality of the reinforcing fiber bundles and has a larger weight of reinforcing fibers per unit area than a weight in the first portion,
      the sheet shaped reinforcing fiber base material has an outer peripheral shape determined according to a shape of the fiber-reinforced resin molded product, and
      the second portion is a region where weight of the reinforcing fibers per unit area is reduced accompanied by transformation of the sheet shaped reinforcing fiber base material that is formed in a shape according to a shape of the fiber-reinforced resin molded product.

2. The sheet shaped reinforcing fiber base material according to claim 1, further comprising:
   a second layer including a plurality of reinforcing fiber bundles arranged such that longitudinal directions thereof are approximately one identical direction and such that at least part of the reinforcing fiber bundles adjoined to each other are restrained with respect to each other, wherein
   the first layer and the second layer are stacked such that the longitudinal directions of the plurality of reinforcing fiber bundles respectively included in the first layer and the second layer are different from each other, and
   at least part of the reinforcing fiber bundles included in the second layer are at least partly restrained to the reinforcing fiber bundles included in the first layer, wherein
   the second layer includes:
      a third portion that is located at least partly at a position overlapping the first portion and includes a plurality of the reinforcing fiber bundles; and
      a fourth portion that is located at least partly at a position overlapping the second portion, includes a plurality of the reinforcing fiber bundles and has a larger weight of the reinforcing fibers per unit area than a weight in the third portion.

3. The sheet shaped reinforcing fiber base material according to claim 1, wherein the first layer further includes:
   a first partial layer provided in the first portion and in the second portion and having a fixed weight of the reinforcing fibers per unit area; and
   a second partial layer not provided in the first portion but provided in the second portion and having a fixed weight of the reinforcing fibers per unit area.

4. The sheet shaped reinforcing fiber base material according to claim 1, wherein the reinforcing fiber bundles in the second portion are thicker than the reinforcing fiber bundles in the first portion.

5. The sheet shaped reinforcing fiber base material according to claim 1, wherein the plurality of reinforcing fiber bundles in the second portion are arranged at a narrower interval than an interval of the plurality of reinforcing fiber bundles arranged in the first portion.

6. The sheet shaped reinforcing fiber base material according to claim 1,
   the sheet shaped reinforcing fiber base material having an outer peripheral shape determined according to a shape of the fiber-reinforced resin molded product, wherein
   the first portion and the second portion are determined according to a design requirement of the fiber-reinforced resin molded product.

7. The sheet shaped reinforcing fiber base material according to claim 1, wherein the second portion is a portion forming a region of the fiber-reinforced resin molded product having at least one of a higher strength and a higher rigidity than a strength or a rigidity of a region formed by the first portion.

8. The sheet shaped reinforcing fiber base material according to claim 1, wherein the second portion is a portion forming a region of the fiber-reinforced resin molded product having a larger curvature than a curvature of a region formed by the first portion.

9. The sheet shaped reinforcing fiber base material according to claim 1, wherein the reinforcing fiber bundles adjoined to each other are restrained with respect to each other by a resin binder.

10. The sheet-like shaped reinforcing fiber base material according to claim 1, wherein the reinforcing fiber bundle is made of carbon fibers.

11. A preform comprising:
two or more reinforcing fiber base materials that include the sheet shaped reinforcing fiber base material according to claim 1, formed in a solid shape and fixed in the solid shape.

12. A fiber-reinforced resin molded product comprising:
the preform according to claim 11 impregnated with a matrix resin that is cured.

13. A sheet shaped reinforcing fiber base material used to produce a fiber-reinforced resin molded product, the sheet shaped reinforcing fiber base material comprising:
a first layer including a plurality of reinforcing fiber bundles arranged such that longitudinal directions thereof are approximately one identical direction and such that at least part of the reinforcing fiber bundles adjoined to each other are restrained with respect to each other, wherein
the first layer includes:
a first portion that includes a plurality of the reinforcing fiber bundles; and
a second portion that includes a plurality of the reinforcing fiber bundles and has a larger weight of reinforcing fibers per unit area than a weight in the first portion, and
the reinforcing fiber bundles adjoined to each other are stitched with an auxiliary thread.

14. The sheet shaped reinforcing fiber base material according to claim 13, further comprising:
a second layer including a plurality of reinforcing fiber bundles arranged such that longitudinal directions thereof are approximately one identical direction and such that at least part of the reinforcing fiber bundles adjoined to each other are restrained with respect to each other, wherein
the first layer and the second layer are stacked such that the longitudinal directions of the plurality of reinforcing fiber bundles respectively included in the first layer and the second layer are different from each other, and
at least part of the reinforcing fiber bundles included in the second layer are at least partly restrained to the reinforcing fiber bundles included in the first layer, wherein
the second layer includes:
a third portion that is located at least partly at a position overlapping the first portion and includes a plurality of the reinforcing fiber bundles; and
a fourth portion that is located at least partly at a position overlapping the second portion, includes a plurality of the reinforcing fiber bundles and has a larger weight of the reinforcing fibers per unit area than a weight in the third portion.

15. The sheet shaped reinforcing fiber base material according to claim 13, wherein the first layer further includes:
a first partial layer provided in the first portion and in the second portion and having a fixed weight of the reinforcing fibers per unit area; and
a second partial layer not provided in the first portion but provided in the second portion and having a fixed weight of the reinforcing fibers per unit area.

16. The sheet shaped reinforcing fiber base material according to claim 13, wherein the reinforcing fiber bundles in the second portion are thicker than the reinforcing fiber bundles in the first portion.

17. The sheet shaped reinforcing fiber base material according to claim 13, wherein the plurality of reinforcing fiber bundles in the second portion are arranged at a narrower interval than an interval of the plurality of reinforcing fiber bundles arranged in the first portion.

18. The sheet shaped reinforcing fiber base material according to claim 13,
the sheet shaped reinforcing fiber base material having an outer peripheral shape determined according to a shape of the fiber-reinforced resin molded product, wherein
the first portion and the second portion are determined according to a design requirement of the fiber-reinforced resin molded product.

19. The sheet shaped reinforcing fiber base material according to claim 13, wherein the second portion is a portion forming a region of the fiber-reinforced resin molded product having at least one of a higher strength and a higher rigidity than a strength or a rigidity of a region formed by the first portion.

20. The sheet shaped reinforcing fiber base material according to claim 13, wherein the second portion is a portion forming a region of the fiber-reinforced resin molded product having a larger curvature than a curvature of a region formed by the first portion.

21. The sheet shaped reinforcing fiber base material according to claim 13, wherein the reinforcing fiber bundles adjoined to each other are restrained with respect to each other by a resin binder.

22. The sheet shaped reinforcing fiber base material according to claim 13, wherein the reinforcing fiber bundle is made of carbon fibers.

23. A preform comprising:
two or more reinforcing fiber base materials that include the sheet shaped reinforcing fiber base material according to claim 13, formed in a solid shape and fixed in the solid shape.

24. A fiber-reinforced resin molded product comprising:
the preform according to claim 23 impregnated with a matrix resin that is cured.

* * * * *